(12) United States Patent
Espinosa

(10) Patent No.: US 11,915,086 B2
(45) Date of Patent: *Feb. 27, 2024

(54) WIRELESS DEVICE AND SELECTIVE USER CONTROL AND MANAGEMENT OF A WIRELESS DEVICE AND DATA

(71) Applicant: Edward P. Espinosa, Madrid (ES)

(72) Inventor: Edward P. Espinosa, Madrid (ES)

(73) Assignees: Jeffrey S. Melcher; Melcher Patent Law PLLC

( * ) Notice: Subject to any disclaimer, the term of this patent is extended or adjusted under 35 U.S.C. 154(b) by 0 days.

This patent is subject to a terminal disclaimer.

(21) Appl. No.: 18/135,451

(22) Filed: Apr. 17, 2023

(65) Prior Publication Data

US 2023/0252251 A1 Aug. 10, 2023

Related U.S. Application Data

(63) Continuation of application No. 17/951,431, filed on Sep. 23, 2022, now Pat. No. 11,657,240, which is a continuation of application No. 16/930,682, filed on Jul. 16, 2020, now Pat. No. 11,494,569, which is a
(Continued)

(51) Int. Cl.
| | |
|---|---|
| G06K 7/10 | (2006.01) |
| G06K 19/077 | (2006.01) |
| G08C 17/00 | (2006.01) |
| G06Q 10/00 | (2023.01) |

(Continued)

(52) U.S. Cl.
CPC ..... *G06K 7/10297* (2013.01); *G06K 7/10366* (2013.01); *G06K 19/0717* (2013.01); *G06K 19/07773* (2013.01); *G06Q 10/00* (2013.01); *G08C 17/00* (2013.01); *G08C 17/02* (2013.01)

(58) Field of Classification Search
None
See application file for complete search history.

(56) References Cited

U.S. PATENT DOCUMENTS

| | | |
|---|---|---|
| 1,404,400 A | 1/1922 | Moon |
| 1,594,512 A | 8/1926 | Der Lippe-Lipski |
| 2,388,746 A | 11/1945 | Knapp |
| (Continued) | | |

FOREIGN PATENT DOCUMENTS

| | | |
|---|---|---|
| DE | 19858254 A1 | 6/2000 |
| DE | 202004011287 U1 | 9/2004 |
| (Continued) | | |

OTHER PUBLICATIONS

Keurig coffee machine, www.keurig.com, p. 1, (2014).

*Primary Examiner* — Kristy A Haupt
(74) *Attorney, Agent, or Firm* — Jeffrey S. Melcher; Melcher Patent Law PLLC

(57) ABSTRACT

A system and method to provide user marketing recommendations or suggestions based on an interaction between a user and a product, using a radio frequency tag in communication with the product, a radio frequency reader, and a computing device. A motion of the user detected by the radio frequency tag is used to generate a signal containing level of motion, which is utilized by the computing device to determine a level of user interaction and generate marketing information. Marketing information is sent to the user interface device about the product.

23 Claims, 19 Drawing Sheets

Related U.S. Application Data continuation of application No. 16/193,010, filed on Nov. 16, 2018, now Pat. No. 10,747,968.

(60) Provisional application No. 62/589,674, filed on Nov. 22, 2017.

(51) Int. Cl.
  *G08C 17/02* (2006.01)
  *G06K 19/07* (2006.01)

(56) References Cited

U.S. PATENT DOCUMENTS

| | | |
|---|---|---|
| 2,425,816 A | 8/1947 | Maxson |
| 2,823,833 A | 2/1958 | Bauerlein |
| 2,894,845 A | 7/1959 | Stoddard |
| 3,116,610 A | 1/1964 | Whitmore |
| 3,216,214 A | 11/1965 | Gasbarro |
| 3,409,447 A | 11/1968 | Jeppson |
| 3,716,180 A | 2/1973 | Bemis |
| 4,179,596 A | 12/1979 | Bjork |
| 4,222,276 A | 9/1980 | DeRogatis |
| 4,340,797 A | 7/1982 | Takano |
| 4,340,798 A | 7/1982 | Ueda |
| 4,340,800 A | 7/1982 | Ueda |
| 4,351,999 A | 9/1982 | Nagamoto |
| 4,430,540 A | 2/1984 | Scalf |
| 4,513,189 A | 4/1985 | Ueda |
| 4,517,026 A | 5/1985 | Inoue |
| 4,557,118 A | 12/1985 | Pink |
| 4,697,057 A | 9/1987 | Fowler |
| 4,725,948 A | 2/1988 | Mierzwinski |
| 4,755,646 A | 7/1988 | Fowler |
| 4,841,661 A | 6/1989 | Moore |
| 4,909,014 A | 3/1990 | Kobayashi |
| 5,046,332 A | 9/1991 | Hermann |
| 5,095,717 A | 3/1992 | Germi |
| 5,112,630 A | 5/1992 | Scott |
| 5,121,677 A | 6/1992 | Le Claire |
| D326,663 S | 8/1992 | Girardon |
| 5,142,970 A | 9/1992 | ErkenBrack |
| 5,157,940 A | 10/1992 | Bertu |
| 5,195,427 A | 3/1993 | Germano |
| 5,237,142 A | 8/1993 | Cigarini |
| 5,271,240 A | 12/1993 | Detrick |
| 5,272,963 A | 12/1993 | Del Fabbro |
| 5,332,095 A | 7/1994 | Wu |
| 5,334,402 A | 8/1994 | Ovadia |
| 5,347,918 A | 9/1994 | Chen |
| 5,390,809 A | 2/1995 | Lin |
| 5,398,811 A | 3/1995 | Latella |
| 5,492,703 A | 2/1996 | Gics |
| 5,494,165 A | 2/1996 | Detrick |
| 5,521,359 A | 5/1996 | Bone |
| 5,522,216 A | 6/1996 | Park |
| 5,605,047 A | 2/1997 | Park |
| 5,628,404 A | 5/1997 | Hendrix |
| 5,806,575 A | 9/1998 | Tsay |
| 5,837,193 A | 11/1998 | Childers |
| 5,859,412 A | 1/1999 | Yagi |
| 5,946,919 A | 9/1999 | McKinney |
| 5,964,255 A | 10/1999 | Schmidt |
| 6,090,422 A | 7/2000 | Taragan |
| 6,121,593 A | 9/2000 | Mansbery |
| 6,148,875 A | 11/2000 | Breen |
| 6,264,054 B1 | 7/2001 | Miyake |
| 6,297,479 B1 | 10/2001 | Wefers |
| 6,442,866 B2 | 8/2002 | Wefers |
| 6,497,276 B2 | 12/2002 | Clark |
| 6,510,946 B2 | 1/2003 | Gutierrez |
| 6,904,761 B2 | 6/2005 | Rafalovic |
| 6,971,418 B2 | 12/2005 | De Costa |
| 7,012,229 B2 | 3/2006 | Kim |
| 7,048,136 B2 | 5/2006 | Havens |
| 7,131,550 B2 | 11/2006 | Vilalta |
| 7,253,734 B2 | 8/2007 | Moskowitz |
| 7,277,016 B2 | 10/2007 | Moskowitz |
| 7,279,666 B2 | 10/2007 | Ito |
| 7,325,409 B2 | 2/2008 | Espinosa |
| 7,488,919 B2 | 2/2009 | Gagas |
| 7,823,626 B2 | 11/2010 | Mueller |
| 7,933,733 B2 | 4/2011 | Ashrafzadeh |
| 7,987,984 B2 | 8/2011 | Gipson |
| 8,191,465 B2 | 6/2012 | Sager |
| 8,345,132 B2 | 1/2013 | Stephens |
| 8,490,871 B1 | 7/2013 | Miller |
| 8,563,059 B2 | 10/2013 | Luckhardt |
| 8,662,334 B2 | 3/2014 | Turvey |
| 8,669,581 B2 | 3/2014 | Jung |
| 8,742,304 B2 | 6/2014 | Emma |
| 8,786,412 B2 | 7/2014 | Ebrom |
| 8,844,831 B2 | 9/2014 | Mullis |
| 9,405,945 B1 | 8/2016 | Diorio |
| 9,449,208 B2 | 9/2016 | Luk |
| 9,563,833 B2 | 2/2017 | Swager |
| 9,958,203 B2 | 5/2018 | Fu |
| 10,178,873 B2 | 1/2019 | Durance |
| 10,584,915 B2 | 3/2020 | Nelson |
| 10,747,968 B2 | 8/2020 | Espinosa |
| 11,104,502 B2 | 8/2021 | Espinosa |
| 11,494,569 B2 * | 11/2022 | Espinosa ............... G08C 17/02 |
| 11,657,240 B2 * | 5/2023 | Espinosa ............ G06K 7/10366 |
| | | 235/451 |
| 2003/0024278 A1 | 2/2003 | Berkey |
| 2003/0070789 A1 | 4/2003 | Mueller |
| 2004/0100380 A1 | 5/2004 | Lindsay |
| 2005/0051541 A1 | 3/2005 | Kim |
| 2005/0103466 A1 | 5/2005 | Landry |
| 2006/0117763 A1 | 6/2006 | Espinosa |
| 2007/0158335 A1 | 7/2007 | Mansbery |
| 2007/0208456 A1 | 9/2007 | Uland |
| 2007/0234754 A1 | 10/2007 | Pimputkar |
| 2007/0246453 A1 | 10/2007 | Nam |
| 2008/0001742 A1 | 1/2008 | Bauchot |
| 2008/0006041 A1 | 1/2008 | Nakata |
| 2008/0041233 A1 | 2/2008 | Bunn |
| 2008/0041947 A1 | 2/2008 | Hollister |
| 2008/0052201 A1 | 2/2008 | Bodin |
| 2009/0084778 A1 | 4/2009 | Smario |
| 2009/0188911 A1 | 7/2009 | Emma |
| 2010/0084396 A1 | 8/2010 | Wu |
| 2010/0200555 A1 | 8/2010 | Godecker |
| 2010/0213187 A1 | 8/2010 | Bandholz |
| 2010/0234045 A1 | 9/2010 | Karr |
| 2011/0143000 A1 | 6/2011 | Fiset |
| 2011/0315566 A1 | 12/2011 | Boynton |
| 2012/0034350 A1 | 2/2012 | Gard |
| 2012/0097667 A1 | 4/2012 | Niklasson |
| 2012/0129358 A1 | 5/2012 | Ogawa |
| 2012/0199571 A1 | 8/2012 | Brown |
| 2012/0211486 A1 | 8/2012 | Kasai |
| 2012/0267369 A1 | 10/2012 | Duvigneau |
| 2012/0318693 A1 | 12/2012 | Conner |
| 2013/0075389 A1 | 3/2013 | Ashida |
| 2013/0075390 A1 | 3/2013 | Ashida |
| 2013/0092032 A1 | 4/2013 | Cafferty |
| 2013/0186887 A1 | 7/2013 | Hallgren |
| 2013/0306627 A1 | 11/2013 | Libman |
| 2013/0320001 A1 | 12/2013 | Kondo |
| 2013/0330447 A1 | 12/2013 | Holman |
| 2014/0009291 A1 | 1/2014 | Request |
| 2014/0077949 A1 | 3/2014 | Brinkley |
| 2014/0203012 A1 | 7/2014 | Corona |
| 2014/0232519 A1 | 8/2014 | Allen |
| 2014/0246424 A1 | 8/2014 | Shimomura |
| 2014/0248784 A1 | 8/2014 | Hayashi |
| 2014/0251982 A1 | 9/2014 | Emma |
| 2014/0284239 A1 | 9/2014 | Espinosa |
| 2015/0019354 A1 | 1/2015 | Chan |
| 2015/0116093 A1 | 4/2015 | Swager |
| 2015/0289324 A1 | 10/2015 | Rober |
| 2016/0140526 A1 | 5/2016 | Cummins |
| 2016/0162715 A1 | 6/2016 | Luk |
| 2016/0174748 A1 | 6/2016 | Baldwin |

(56) References Cited

U.S. PATENT DOCUMENTS

| | | |
|---|---|---|
| 2016/0180723 A1 | 6/2016 | Tatourian |
| 2016/0217417 A1 | 7/2016 | Ma |
| 2016/0292634 A1 | 10/2016 | Mehring |
| 2016/0300285 A1 | 10/2016 | Gandhi |
| 2016/0327279 A1 | 11/2016 | Bhogal |
| 2016/0379176 A1 | 12/2016 | Brailovskly |
| 2016/0379434 A1 | 12/2016 | Huang |
| 2017/0000292 A1 | 1/2017 | Park |
| 2017/0261213 A1 | 8/2017 | Park |
| 2017/0262973 A1 | 9/2017 | Johnston |
| 2017/0263100 A1 | 9/2017 | Johnston |
| 2017/0270474 A1 | 9/2017 | McCoy |
| 2018/0053140 A1 | 2/2018 | Baca |
| 2018/0093814 A1 | 5/2018 | Espinosa |
| 2018/0204031 A1 | 7/2018 | He |
| 2018/0216830 A1 | 8/2018 | Ivanovic |
| 2018/0249735 A1 | 9/2018 | Espinosa |
| 2018/0260680 A1 | 9/2018 | Finkelstein |
| 2018/0290809 A1 | 10/2018 | Espinosa |
| 2019/0156079 A1 | 5/2019 | Espinosa |
| 2020/0012906 A1 | 1/2020 | Albadawi |
| 2020/0042839 A1 | 2/2020 | Herold |
| 2020/0170514 A1 | 6/2020 | Hui |
| 2020/0349328 A1 | 11/2020 | Espinosa |

FOREIGN PATENT DOCUMENTS

| | | |
|---|---|---|
| EP | 0405680 A2 | 1/1991 |
| EP | 0440296 A1 | 8/1991 |
| EP | 0545246 A2 | 6/1993 |
| JP | 2000-2479 A1 | 1/2000 |
| JP | 2001-013837 | 1/2001 |
| JP | 2004085004 A | 3/2004 |
| KR | 20120011458 | 2/2012 |
| WO | 90/13779 A1 | 11/1990 |
| WO | 96/31746 A1 | 10/1996 |
| WO | 01/71263 A1 | 9/2001 |
| WO | 2005/057103 | 6/2005 |
| WO | 2016/109533 | 12/2014 |
| WO | 2016/109563 | 12/2014 |
| WO | 2018/0093814 | 3/2016 |

* cited by examiner

WIRELESS DEVICE AND SELECTIVE USER CONTROL AND MANAGEMENT OF A WIRELESS DEVICE AND DATA

FIELD OF THE INVENTION

The present invention relates to a system and method to provide user marketing recommendations or suggestions based on an interaction between a user and a product, using a radio frequency tag in communication with the product, a radio frequency reader, and a computing device. A motion of the user detected by the radio frequency tag is used to generate a signal containing level of motion, which is utilized by the computing device to determine a level of user interaction and generate marketing information. Marketing information is sent to the user interface device about the product.

BACKGROUND OF THE INVENTION

RFID uses electromagnetic energy to stimulate a tag to self-identify or to provide other stored, collected or generated data. Tag data can be generated or activated using chipless tags or tag components, a sensor, unique data/identifiers or executable code, or combinations thereof. Tag components can include a chip, semiconductor or circuit ("circuit"), a memory, operating circuitry, system on a chip, a connected antenna, or combinations thereof. A passive tag can also include an antenna and an application-specific integrated circuit (ASIC) chip.

A tag can provide stored, generated, collected or activation data from tag components, sensor, pulsing, code, data, identifiers, and combinations thereof, among others, in response to a radio frequency interrogation signal from a reader. Similarly, a near-field coherent sensing application can direct electromagnetic energy or radio wave pulse sensing into a body, tissue, product or object using a tag that can be interrogated by a reader to receive generated or pulsed data. Near-field coherent sensing ("NCS") can modulate external and internal vital signs, motion or change of human or non-human ("users") body, tissue or structure onto multiplexed radio frequency signals and transmit those signals with a unique digital identification or code, as described herein.

Current tag applications are commonly used to track and monitor a product for supply chain and inventory management purposes. For example, a tag can be used with or disposed, embedded or attached to the exterior or interior of a CPG/FMCG product or container or a reader enabled smart appliance, speaker, tablet, phone, reader, beacon, wearable or device ("appliance/device") or can be attached to or sewn into a garment, helmet, hat, shoe, sock, collar, band, strap, belt, bedding or any other clothing or device ("garment") constructed to hold and position a tag to direct a tag signal. Tags or sensors are usually manufactured with a unique identification number (e.g., a tag identifier can include a memory bank to store a product unique tracking identifier ("electronic product code" or "EPC")) comprising a serial number, an associated check digit or product/service or user information and identifiers, or combinations thereof. A unique serial or identification number typically cannot be altered and the number is usually used once. Further, a tag can be read-only, responding to an interrogation signal with a unique identification number, tag, product, appliance/device, technology, sensor, network, module, data or activation data ("identifier"). A unique serial number, identifier, signal or code can also correspond to the attached or associated user, product, service, appliance/device, garment, technology and platform, database or network, server or data module or stores ("network" or "platform"). In other embodiments, a tag may not store a unique serial number on a circuit but can incorporate for example aluminum fibers into labels or paper so that RF energy reflects off the fiber a unique signal that a computer can then turn into a unique serial number.

A tag, sensor, generated or activation data technology, such as a run or executable code or respective reference, enables a tag to store, generate, collect or provide activation data that can be processed, analyzed, converted, shared or stored by or on a tag, appliance/device, technology, network or in respective data modules. See for example, Patent Application No. 20180204031, which is incorporated herein by reference in its entirety. Tag generation or activation data can be configured with a digital reference to connect to or communicate with data incorporated, related or associated with appliance/device, technology, network or data modules. Data module connections or relationships can include and activate next step data actions or processes for an appliance/device, network or data modules that can include home, retailer, wholesaler, manufacturer, hospitality, industrial, healthcare, agricultural or food/recipe products, services or providers and, more specifically, can include: use, monitoring, tracking, generating, converting, reporting, product/service order placement, marketing, payment processing, fulfilment or inventory management solutions, among others.

SUMMARY OF THE INVENTION

The following summary presents certain aspects of the disclosed invention and is not intended as a detailed overview. The primary purpose is to provide a brief presentation of certain concepts that include embodiments, systems, programs, methods, software or applications that will be described in more detail and with others herein. All FIGs. and disclosure herein can represent software, applications, processes, systems, flowcharts or block diagrams.

The present invention provides in part a tag with a selective user controlled means to deactivate, activate, disable or reconfigure a tag to protect from untimely or unauthorized interrogation or to control and manage user, product, generated, collected or data activation technology that can be configured to provide next step data actions. To this point, the invention provides a mechanical or manual means to allow a user to selectively deactivate, activate, disable or reconfigure a tag, provide a physical or digital confirmation and initiate next step data actions. The user controlled means includes a cover or material to cover or encapsulate the sensor so that the sensor is not exposed to the surrounding environment and cannot generate sensor data.

Another aspect of the present invention provides appliance/device, technology, garment, network or data modules to create a more efficient and self-operating home, retail, wholesale, manufacture, hospitality, industrial, healthcare, agricultural or food/recipe product, service or provider market. As noted, tag generated, activated or data technology can create data module connections or relationships regarding one, a series or sequence of predetermined, selected or software or algorithm computed next step data actions by, between and among a user, an appliance/device, technology, garment or network, data modules and products, services or providers. In turn, these data modules and next step data actions can provide improved data communication and efficiencies throughout the inventory and supply chain management system. Accordingly, these data modules, systems and methods can include and enable additional participants to connect and communicate with users, products, services or providers. For example, a tag can communicate and connect with an appliance/device or network data module for pharmaceutical and medical, agricultural, food and recipe, automotive and transport, insurance, security and emergency sectors to provide user related products, services or providers as well as supply, inventory, product order, fulfillment and payment products or services. These appliance/device, technology, garment, network or data modules can be configured to create a more reliable and automated service and business platform to provide improved costs, services and reach by combining disparate and fragmented markets with communication and data efficiencies and economies of scale solutions.

Another aspect of the present invention provides methods or processes to convert tag, sensor, generated or data activation technology into synthesized human speech or text. Tag voice recognition processing technology can convert tag electrical, modulation, amplitude, phase, sine, wave form, resistivity or signal output changes, and any others described herein, and other data activation and related tag product, identifier or code data into synthesized human speech or text and transform these signals into coding patterns with assigned meanings. This process can be incorporated into an appliance/device, technology, garment, network or data module, or combinations thereof.

Another embodiment provides an appliance/device, technology or garment that can be configured to communicate with or incorporate an embedded tag reader module configured to scan and read tag generated, activation or data and process this data to track, monitor, locate, detect or report a user, goods, services or providers and to activate next step data actions.

Another embodiment provides a method and system for the use of multiple brand logos or names with communicative indicia attached or connected to an appliance/device, technology, garment, container or related marketing or packaging wherein at least one of the brand logos or names (such as a secondary or tertiary brand logo or name) can be used to represent a unique, different or distinct product, service or benefit from the primary brand logo or name or provide an association for a related product, service or provider.

Objectives of the invention can be me obtained a system to provide user marketing recommendations or suggestions based on a level of interaction between a user and a product, comprising:
a radio frequency tag in communication with the product;
a computing device comprising a processor and a non-volatile, non-transitory memory, and configured to communicate with a user interface device, the computing device configured to utilize artificial intelligence;
a radio frequency reader in communication with the computing device configured to receive a signal from the radio frequency tag;
the radio frequency tag configured to send the signal to the computing device, the signal containing identity information about the product;
the radio frequency tag configured to measure a motion of the user when in contact or close proximity to the radio frequency tag and the product;
the radio frequency tag configured to send a signal to the radio frequency reader, the signal containing information about the motion of the user;
an application stored in the non-volatile, non-transitory memory, configured to use artificial intelligence, and executable by the processor to:
identify the product based on the identity information received from the radio frequency reader;
interpret the signal to determine a level of the measured motion of the user with the radio frequency tag and the product;
determine a level of user interaction with the radio frequency tag and the product based on whether the level of motion of the user fails, maintains, reaches or exceeds a determined level;
when the level of user interaction reaches or exceeds the determined level generating marketing information for the product; and
transmit the marketing information to the user interface device.

Objectives of the invention can also be obtained by a method of providing user marketing recommendations or suggestions based on a level of interaction between a user and a product, comprising:
providing a radio frequency tag in communication with the product;
providing a computing device comprising a processor and a non-volatile, non-transitory memory, and configured to communicate with a user interface device, the computing device configured to utilize artificial intelligence;
providing a radio frequency reader in communication with the computing device configured to receive a signal from the radio frequency tag;
the radio frequency tag sending the signal to the computing device, the signal containing identity information about the product;
the radio frequency tag measuring a motion of the user in contact or close proximity to the radio frequency tag and the product;
the radio frequency tag sending a signal to the radio frequency reader, the signal containing information about the motion of the user;
executing by the processor an application stored in the non-volatile, non-transitory memory, using artificial intelligence, to:
identify the product based on the identity information received from the radio frequency reader;
interpret the signal to determine a level of the measured motion of the user with the radio frequency tag and the product;
determine a level of user interaction with the radio frequency tag and the product based on whether the level of motion of the user fails, maintains, reaches or exceeds a determined level;
the level of user interaction reaching or exceeding the determined level and generate, based on the user interaction with the product, marketing information for the product; and
transmitting the marketing information to the user interface device.

Objectives of the invention can further be obtained by a method of providing marketing recommendations or suggestions based on a level of interaction between a user and a plurality of products, comprising:
providing a plurality of radio frequency tags each in communication with a respective product;
providing a computing device comprising a processor and a non-volatile, non-transitory memory, and configured to communicate with a user interface device, the computing device configured to utilize artificial intelligence;

providing a radio frequency reader in communication with the computing device configured to receive a signal from the plurality of radio frequency tags;

each radio frequency tag sending a signal to the computing device, the signal containing identity information about the respective product;

each radio frequency tag measuring a motion of the user in contact or close proximity to each radio frequency tag and the respective product;

each radio frequency tag configured to send the signal to the radio frequency reader, the signal containing information about the motion of the user;

executing an application stored in the non-volatile, non-transitory memory by the processor using artificial intelligence to:

identify the product based on the identity information received from the radio frequency reader;

interpret the signal to determine a level of the measured motion of the user with the radio frequency tag and the product;

determine a level of user interaction with each radio frequency tag and each product based on whether the level of motion of the user fails, maintains, reaches or exceeds a determined level;

the level of user interaction reaching or exceeding the determined level and generate, based on the user interaction with the product, marketing information for the product; and transmitting the marketing information to the user interface device.

DETAILED DESCRIPTION OF THE INVENTION

Figure 1:
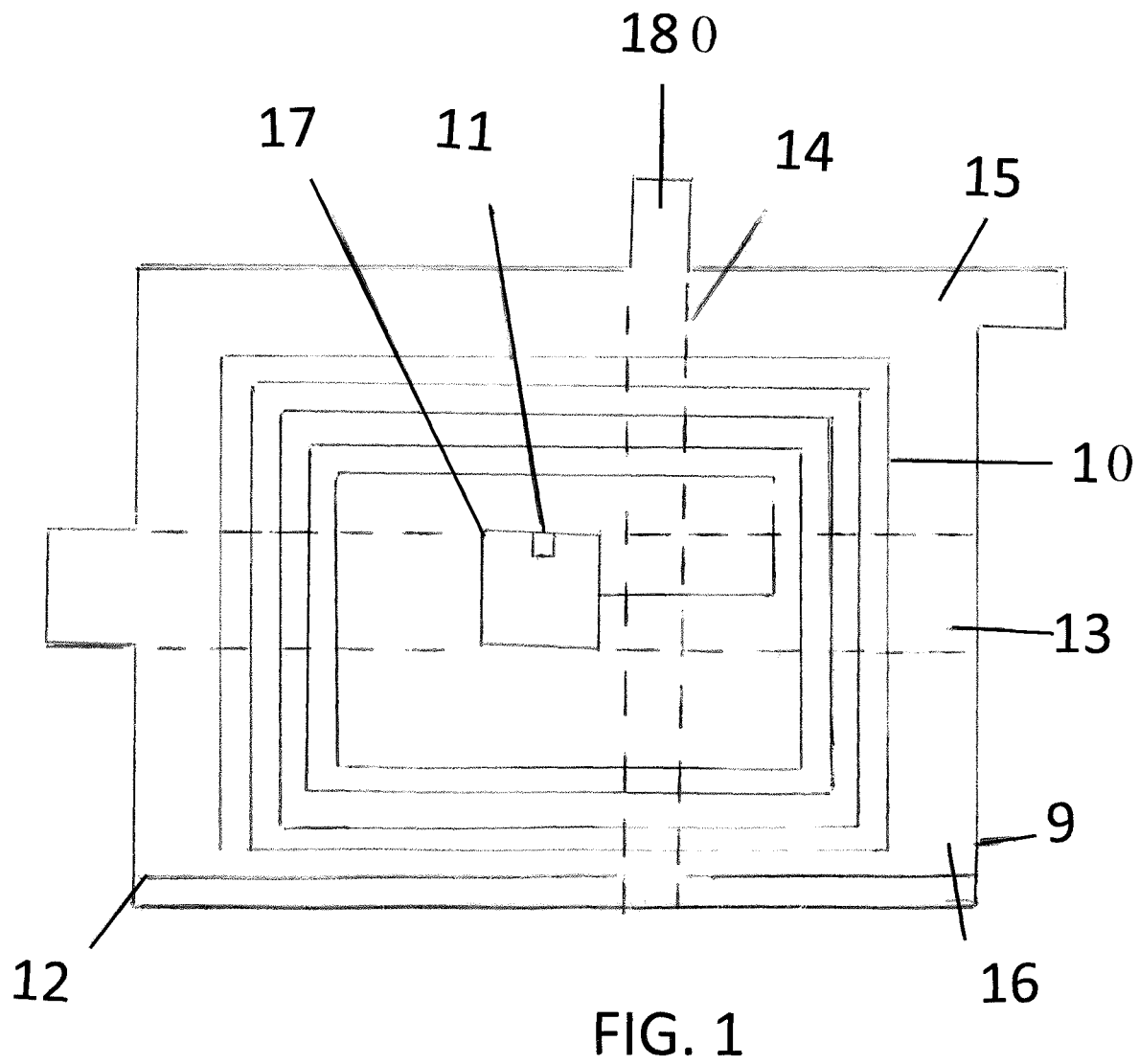
FIG. 1 illustrates an embodiment of a tag with a sensor portion and activation data and an antenna with deactivating pull tabs and a sensor or circuit/memory seal with a removable material to activate sensor, code or data by removing a tab or peel-off layer on a tag to initiate a next step data action.

The present invention discloses tag technologies constructed to incorporate pulse sensing, sensor or other data generation or activation technologies that are configured to create appliance/device, garment, container, technology, network or data module relationships, processes or next step data actions. For example, a tag can be incorporated into a CPG; FMCG; product; food item; container; user; appliance/device; technology; or garment. Tag data in communication or connection with data modules can be enabled when a tag generates or activates certain data, combinations of data or thresholds, levels or amounts. Data module or store relationships and connections with an appliance/device, garment, technology, container or network can include home, retail, wholesale, manufacture, hospitality, industrial, healthcare, agricultural or food/recipe tag data generation or activation; tag signal processing and conversion to synthesized human speech or text; and monitoring, tracking, locating and reporting: product order placement and fulfilment; product freshness or projected shelf-life; ambient air conditions; body, tissue or product vital signs, movement or change; healthcare and well-being monitoring; consumer product/service engagement; authentication; merchandising and marketing; or data authentication and management, among others.

As used herein tag generated or activation data or technology can include a tag configured to generate or activate data using pulse sensing; a sensor; selective user controls to manage tag data exchange or activation; or unique tag, user, data module, product, service, provider identifiers, code or executable code or references thereto, and combinations thereof. For example, in one embodiment, a tag sensor can be made from a sensing material such as a metal or other similar based material and comprise a tag antenna to generate data ("pulse sensing"). A tag can also be configured to detect or measure the presence, level, quantity or threshold levels of a gas, volatile organic compound, chemical or stimuli ("gas" or "gases") in a container or ambient area. A tag can detect or react to the presence of a gas with a change in a tag resistivity or signal output. This resistivity or signal output change combined with a tag, product, user or purchaser identifier can be interrogated and sent by a reader to a local or remote appliance/device, network, server or inventory management system and related data set modules to analyze and interpret the signal change and to provide next step data actions. See for example, U.S. Pat. No. 9,563,833 and U.S. Patent Application Nos. 20180290809, 20180093814, 20180249735 and 20170263100, which are incorporated herein by reference in their entirety. A tag can connect to, communicate with or affix to a user, product, container, appliance/device, garment, technology or ambient area. A tag can comprise one or multiple sensors configured to detect different or unique gases, to pulse or modulate a signal or other tag generation or activation technologies. In another embodiment, a tag with a sensor portion can be combined with a temperature and humidity sensor to communicate with an appliance/device and network. Analyzed and processed tag and sensor generated data can compare gas, temperature and humidity levels or concentrations of gas of a product or food item (e.g., meat) in a container or appliance/device storage compartment to track freshness and spoilage grades that can include high, medium, low or spoiled designations.

Further, a tag can be configured to detect levels of freshness or spoilage of a product; an ambient gas; element or condition; detect the presence of harmful ambient gases, contaminants or explosives; monitor, track or report body vital signs, movement or changes to a body or tissue, among others; and to provide appliance/device, garment, technology, container, user or network notifications when certain tag generation or activation data such as body vital signs or gas levels do not respond or report, fail, maintain, reach or exceed a predetermined, selected or software or AI selected profile, signature or comparative database level, threshold, amount or combination.

Pulse sensing can incorporate techniques described by X. Hui and E. C. Kan, "Vital signs over multiplexed radio by near-field coherent sensing", *Nature Electronics*, vol. 1, doi: 10.1038/S41928-017, Jan. 2018. (Featured in Nature Research News)(including Electronic supplementary materials), which is incorporated herein by reference in its entirety. Provided is a method using electromagnetic energy or radio wave pulse sensing directed by a tag into a user's body or tissue to allow interrogation by a reader to receive the generated or pulsed data. Pulse sensing or NCS can modulate the external and internal vital signs, motion or change of a user's body or tissue (e.g., human, livestock, poultry, pets, etc.) onto multiplexed radio frequency signals by integrating a digital identification or code that transmits with a generated signal. Pulse sensing or NCS can utilize both RF signal amplitude and phase to sense and isolate a user's body or tissue vital signs, movement or change, among other applications.

In one application, the high frequency component of pulse sensing or NCS signal can be used to mitigate body movement interference to collect more accurate blood pressure, heartrate or other body metrics. A unique ID corresponding to a tag provides improved discrimination of the signal from ambient interference and other tags. Pulse sensing or NCS tag application can but does not require a tag to directly contact a user's skin and can be used as a remote monitoring sensor with either active or passive radio frequency identification tags in proximity to or attached to or embedded in a user; attached to a garment, appliance/device, container, technology or other attaching or supporting mechanism to hold and position a tag to an area to be monitored and interrogated by a reader to track, monitor and report in real-time a user's heart or respiration rate, blood pressure or breath effort, among other health and well-being metrics.

Another embodiment provides a tag, a tag with a sensor portion or an executable code or reference to an executable code stored on a tag circuit or memory that can be interrogated and executed by a reader or appliance/device. Code in one embodiment can provide data, instructions, algorithms or software to interpret or process tag generated data for pulse sensing, sensor data such as tag resistivity or signal output changes, modulated or demodulated pulsing signals, tag data conversion to synthesized human voice or text to provide response or query actions or next step data actions.

For example, tag data or code can be configured to open an application in an appliance/device to setup and operate a tag and data when activated, as discussed herein. A tag can be activated to automatically access an appliance/device application to set up user data and controls to monitor, track and report pulse sensing, sensor data generation or next step data actions which can be selected, configured and programmed by a user with tag, product, marketing, network or appliance/device suggestions or recommendations. Further, tag data or code can be configured so that when activated a product or service order is automatically placed; a product is placed into a virtual shopping basket; a product or marketing landing page is automatically opened with an order option; a product image is displayed on an appliance/device or television display with a purchase or browse option; and to provide the previously noted options including voice, text or converting the aforementioned actions into synthesized human speech or text for a user to engage with an appliance/device. Further, a tag sensor can be configured to control the execution of a code or code reference so that the code is executed only when a sensor is activated or combinations thereof.

For example, a computer system, program or method can be configured to process tag generated or activated data, as described herein, to include an appliance/device or network comprising a processor with a computer-readable memory and readable tangible storage medium with program instructions stored on the tangible storage medium to be executed by a processor. A network computer system, program or method, as described herein, can receive the executable content or unique identifiers from a tag, appliance/device, garment, container, technology or network reader. The content can be a program code that can be executable by a reader, appliance/device, garment, technology or network and the content can be provided by a tag to a reader to cause the content to be executed. The content can be executed by retrieving a code that can include a location specified by a reference to the code. A reference can be part of the received content. The code or content can be sent to a respective appliance/device, garment, technology or network module to be executed which can include executing any of the actions or next step data actions noted herein. Associated or tag generated or activated data can be retrieved, analyzed or processed using an appliance/device, garment, technology or network data to perform any of the next step data actions described and discussed herein.

FIG. 1 shows a tag 9 that can be used, affixed or attached with or to a user, appliance/device, garment, container or product. A tag can be configured to incorporate data generation, sensor 11 or activation technology such as an executable code, tag identifier, unique user or product data or identifiers such as a stock keeping code (SKU), universal product code (UPC), European article number (EAN), serial or model number configured to generate or activate data for tracking, monitoring, locating, reporting, order placement, marketing, product freshness and user body vital signs and related levels or thresholds and reporting levels and any others described herein.

Figure 2:
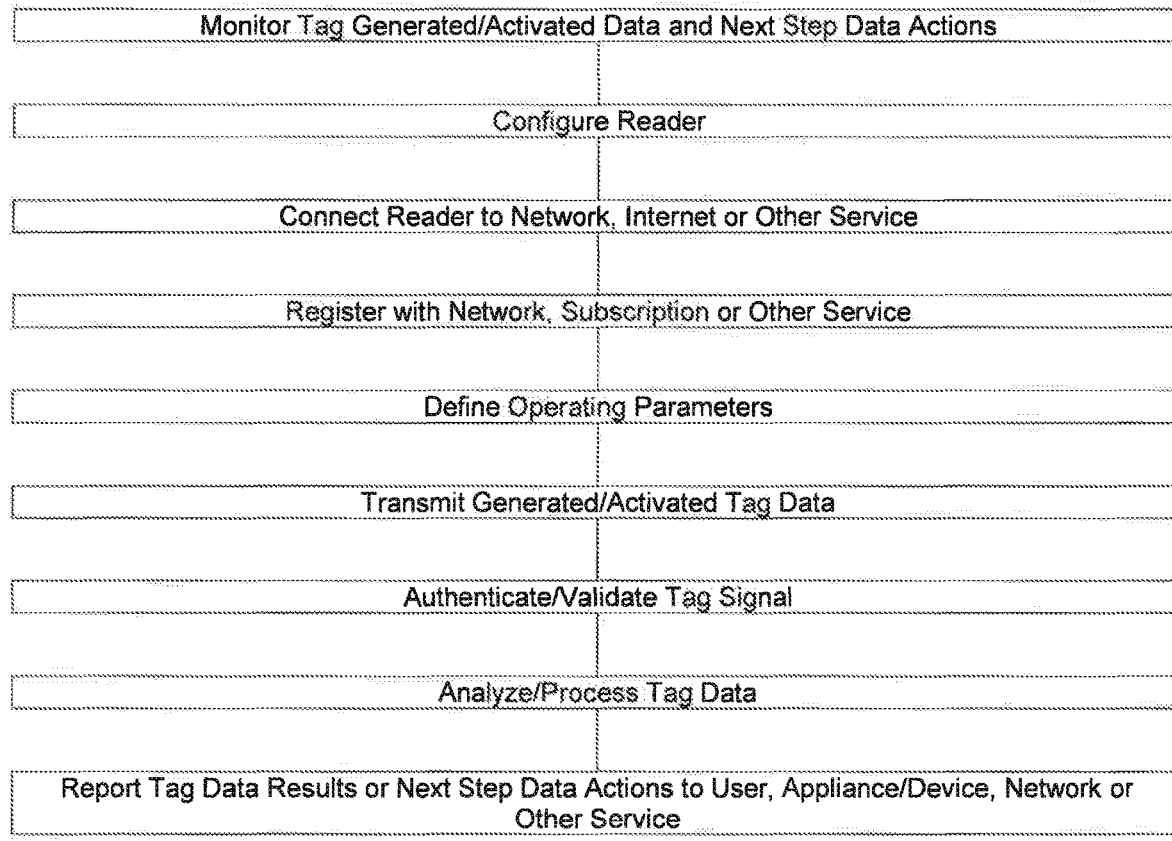
FIG. 2 illustrates a block diagram of a method or system for a tag Internet or subscription model.

Tag data can be interrogated by a reader system comprising a reader device with an antenna. With a passive or semi-passive tag, an antenna broadcasts an interrogation signal to a tag that responds by transmitting generated or activation data back through the sensor or antenna to the reader. Data can be transmitted to or in communication with a tag data module or processing system which can be localized in an appliance/device, garment, technology, container or network in communication with data modules or a computing appliance/device or network to store, analyze, process, convert or respond to data queries, prompts or next step data actions by using software, algorithms, code, directions, neural networks, AI and other processes or combinations to interpret data or to transmit data to a remote computing appliance/device via cloud or other network system to store, analyze, convert or interpret data and respond to user, sequenced or automated data queries. Data processing can be localized, network or data-based and configured as an internet or subscription service. As shown in FIG. 2, a subscription based service can be structured to provide analysis, interpretation and queries, as noted herein, of generated or activated data configured in modules or next step data actions as well as providing user product goods, services or providers. Data processing, modules or next step data action systems can process received generated, activated or next step data actions depending on the intended function or use of a tag. For example, a tag processing system can be configured to provide automated or sequenced product order placement and delivery, food freshness or user vital signs for body, tissue or product data. A tag processing system can further be configured to analyze, authenticate, validate and determine tag signals, generation or activation such as pulse sensing, gas concentration levels, location or mobility monitoring, code, data and unique identifiers and unique tag signal generation with specific or designated actions, which can include any of the disclosed herein, with an appliance/device or network.

As shown in FIG. 1, a tag 9 with an antenna 10 or sensor portion 11 can receive an RF interrogation signal from a reader and broadcast an RF response to an interrogation signal with pulsing, generated, activation or next step data actions. Typically tags incorporate linear- or circular-polarized antennas that can be constructed as a series of nested conductive rectangular patterns with adjacent patterns constructed to contact a short conductive lead that can also connect to or communicate with a sensor.

An embodiment in FIG. 1 shows a single 12 or double perforation line 13 ora pre-cut application 14 to facilitate separating tag components. These applications can be manufactured or constructed into or around a circuit 17, antenna 10, sensor 11 or substrate 16 to easily separate tag components along a line of perforations or other pre-cuts to disable a tag by separating the antenna, sensor or circuit from each. Furthermore, a pull tab 180 connected to a substrate, perforations or other material to separate the components can be incorporated to separate and disable a tag. A user can separate the antenna, sensor or circuit from each other, in any order or combination, to control, deactivate, reconfigure or disable a tag. Additionally, a tag can be configured to visually or digitally confirm the aforementioned steps or processes. A tag reader or appliance/device can be used to confirm any of the steps or processes herein and provide confirmation with an appliance/device, display or with synthesized human speech, text or an audible reader confirmation that a tag signal or generated or activated data is not sent or is no longer received. The aforementioned tag structures are constructed to deactivate a tag. A reader with associated software or processing can identify a tag as unreadable or absent and in turn provide a next step data action such as placing a product order for an absent product, converting said action into synthesized human speech or text to inform a user or appliance/device that a product is absent, an order has been placed or to ask if an order should be placed or provide another or sequenced data action.

As shown in FIG. 1, a circuit, sensor or antenna, or portions thereof, can be sandwiched between two layers of packaging material 15. A sensor can be hermetically sealed by a layer until the removable material is removed to expose the sensor. The removable material can be reapplied after removal to recover the tag, sensor or components. The layers can be manufactured so that the adhesion of the circuit, sensor or antenna to the upper or lower layer of the packaging material is greater than its adhesion to the upper or lower layer which in turn can be affixed to an appliance/device, garment, container, product or user. Another layer or part thereof can be provided on either side of a tag including an adhesive material so that a layer or portion thereof can be removed and the tag can be affixed or attached to a user, product, container, garment or appliance/device using the exposed adhesive material. In this way, a tag can be adhesively disposed or attached to a user so that the tag and components are protected by outer layers and allow generated tag data to be interrogated through a plastic layer. Further, this application can produce a peel-off layer 16 affixed by an adhesive material or layer to a circuit, sensor or antenna, or parts thereof. A circuit, sensor or antenna can be removed or destroyed by delaminating the tag by pulling or removing the upper or lower layer of material from the tag and removing a circuit, sensor or antenna, or parts thereof. A pull tab connected to the upper or lower layer of packaging can be used to facilitate the delamination process. The tag can be configured so that only a portion of the circuit, sensor or antenna is removed; for example, the portion above a peel-off line 12. In one example, this process can leave a pair of short antenna lines or connections, contacts or stubs attached to the circuit, sensor or antenna. A pull tab can also provide a conducive material on one side contacting the tag and specific points or connectors so that when the tab is pulled it either breaks, disconnects or deactivates existing connections or in reverse can create new connections to change the tag resistivity, create tag connections or reception. Furthermore, a tag, components or a sensor portion can be sealed individually or together with a signal blocking material to prevent the tag from sharing data or being interrogated by a reader until the sealing material is removed. When the material is removed it allows tag data to be shared and read by a reader or can allow the tag/sensor portion to generate data and to be interrogated by a reader. In another embodiment, a tag portion can be sealed and covered by a material (e.g., a plastic) to allow tag data such as tag or product identifiers or other unique tag information to be read by a reader through the plastic material covering the tag to enable supply chain or inventory management monitoring and tracking purposes but to prevent the sealed sensor to generate data until the material sealing the sensor is removed from the tag. In each case, a sealing material can be removed by peeling off a layer, using a pull tab, puncturing the sealing material or a coating material covering tag components can be removed as noted to activate a sensor. Tag sealing material can include foil, insulated foil, metal-on-paper sticker, or metal or signal blocking material, plastic or any other materials depending upon the tag's intended use. A supply chain tag can use a plastic covering to allow tag data to be collected and read while a sensor is sealed and a signal blocking material such as foil to prevent a reader from interrogating tag activation data such as an executable code or unique identifiers or data.

In another embodiment, the present invention provides tag information exchange control by providing tag structures to allow a user to alter a tag to inhibit the ability of a reader to interrogate the tag. For example, see U.S. Pat. Nos. 7,277,016 and 7,253,734, which are incorporated herein by reference in their entirety. A user can selectively disable a tag circuit, memory, sensor or antenna, or combinations thereof, to prevent the exchange of tag data between the tag and an associated reader configured to result in a next step data action such as placing a product order or marketing action. Next step data actions can cause a product or service to be automatically ordered; placed into a virtual shopping basket/list; open a product ordering, marketing or other landing page; generate a voice or text response or query to a user regarding said actions; cause a product image to be displayed on an appliance/device display or television with an order page or product purchase option; or combined functions and any other actions disclosed herein, among others, that can be configured to initiate other data or initiated action. A user can also manage, select or program next step data actions or sequences via an appliance/device, network, data module, application or user account.

Another aspect of the present invention provides tag data exchange control using tag structures such as a material to cover and seal a tag circuit, tag, sensor portion or tag components, or combinations thereof, to prevent the exchange of tag or sensor data until a user selectively decides to share said tag data and next step data actions. A user can selectively remove a cover or expose a tag to allow or to cause a reader, appliance/device, garment or technology to receive the tag sensor or activation data. The cover can be reapplied as desired. Tag activation data can include, among others, executable code; a reference to an executable code; unique identifiers, codes or descriptors for technology, container, appliance/device, garments, sensors or products; pulsing or sensor data or a tag's resistivity or signal output change, or combinations thereof, among others. In one example, a tag or a tag with a sensor or activation data can incorporate a switch to connect or disconnect tag antenna reception to control tag data generation or activation or interrogation by a reader. See U.S. Pat. No. 8,844,831, which is incorporated herein by reference in its entirety. A tag with a switch can be configured to generate or activate tag data and next step data steps as disclosed herein. For example, in one embodiment a tag switch can be configured to be placed in a deactivated mode so that a tag is prevented from generating, activating or sharing tag data or next step data actions or a reader interrogating said data. A tag can be configured to be placed into an activated mode to enable a tag to generate, activate or transmit tag data or be interrogated by a reader and initiate next step data actions.

A user can selectively remove a cover to expose a tag to allow tag generation and allow a reader, appliance/device, garment, container or technology to receive the tag generated or activation data. The removable cover can be reapplied as desired. Tag activation data can include, among others, executable code; a reference to an executable code; unique identifiers, codes or descriptors for technology, container, appliance/device, garments, sensors or products; pulsing or sensor data or a tag's resistivity or unique or signal output change, or combinations thereof, among others. A reader, however, can be configured to read the stored tag data on the circuit or memory, through a plastic covering but not the generated sensor data until a plastic seal covering is removed to allow an exposed sensor to react to gases, generate and transmit data. The plastic seal can be reapplied to cover the sensor as desired, such as to prevent generated sensor data from being interrogated by the reader.

Furthermore, a tag, as described herein, without a cover can be disposed inside an open/close or tag antenna connect/disconnect container or wrist band structure or device, for example. A tag can be disposed or embedded inside a wrist band or tag connector with an open/close aperture to expose a tag or connect/disconnect a tag antenna structure. When the band aperture is open or connected a tag can generate data and transmit data to a reader and when the aperture is closed or the antenna disconnected the tag is sealed or disconnected and cannot generate or transmit data. The container/band can be constructed with materials to prevent the exchange of tag generated or activation data when the container/band is closed such as a foil, connecting/disconnecting a tag antenna from the circuit or memory using a slide mechanism or other as discussed in the tag switch embodiment or by using other non-readable plastics or materials or readable materials depending upon the intended use purposes of a tag. For example a combination of apertures can be used containing unique data generation or activation data and use a combination of sealing materials. When a container/band is opened or tag antenna connected a tag can generate or activate and transmit to a reader or an appliance/device and provide next step data actions. When closed or disconnected tag data is prevented from being generated, activated or transmitted. This application can be used for any appliance/device or network to selectively allow a user to control a tag, data generation, activation or data transmittal and next step data actions. This application can be used as a digital key to a home, car, door or entrance, payment or any other smart home or digital control device for a smart home appliance/device. As noted, all next step data actions can be selected, programmed or determined by a user or software or AI with an appliance/device, network, application or user account.

Another embodiment provides a tag with a detached antenna with a tag circuit containing a unique combination of user, appliance/device, container, food, technology or product identifiers, descriptors, executable code or reference to executable code. When the tag antenna is detached or disconnected tag data cannot be generated, activated, shared or sent to a reader. When an antenna is attached or connected to or placed into contact with a tag circuit or memory tag data can be generated, activated and read by a reader to provide next step data actions.

Another embodiment provides an alterable tag with a substrate or material sealing a tag and components that can include a sensor or antenna structure extending in different directions from the circuit structure. Notches, perforations, or slits can be included to facilitate tearing or removing tag components or for pulling tabs or removing laminates. Notches can include circles, squares, triangles or rectangles. Suitable pull tabs can be provided in the vicinity of the notches or perforations to facilitate tearing to deactivate or reconfiguration a tag. The removable substrate ore material can be reapplied to seal the tag or components as desired.

For example, a user can tear or pull off a portion of a tag with the tabs, notches or perforations which can show the visibly altered tag and expose a tag or components. The remaining circuit, sensor or truncated antenna can still allow a tag to transmit data but only in close proximity. This can allow a user to disable a tag to prevent generating, activating or transmitting data such as pulse, code or sensor data, to place a product order or other action when a reader detects a product as absent or any other next step data action.

Another embodiment provides a tag including a circuit, sensor or antenna, or combinations thereof, structured to generate or provide data activation technology and disposed inside an open/close container or device and configured to provide next step data actions. An open/close container can be constructed with material to seal the tag, sensor or activation data inside a container so that sensor or data cannot be shared or read when the container is closed. To activate the tag generation or activation data a user opens the container and causes a reader to interrogate the tag, generated or activation data, or combinations thereof, to initiate next step data actions. When a user closes the container the tag is sealed inside the container and data cannot be read until a user reopens the container. In another embodiment, a tag and a circuit or memory with data generation or activation technology can be constructed in proximity to an unattached or disconnected tag antenna. An appliance/device or container button, slide or push mechanism can allow a user to connect a tag circuit or memory and data generation or activation technology with or to a tag antenna to allow a reader to interrogate the connected tag and antenna to read the generated or activation technology to automatically initiate a next step data action. When a user releases the mechanism in one embodiment, a spring or mechanism can separate or disconnect the tag circuit, memory, data generation or activation component from an antenna to cause it to be unreadable. In other embodiments, the aforementioned can be constructed so that each component of a tag can be mechanically or otherwise separate or separated from each other or in combination to cause the same mechanical or next step data action results.

Another aspect of the present invention provides a tag that incorporates a data generation or activation technology configured to create data connections and relationships with network or data modules or stores. For example, tags; CPG; FMCG; food items; containers; healthcare and well-being monitoring and reporting; users; garments; and appliance/devices can comprise corresponding unique identifiers that can be activated by the aforementioned technologies and can be configured to enable data items in a network, data module or data management platform. See for example FIGS. 3 and 4 which depict a tag network incorporating appliance/device or network data modules and stores and next step data actions. The data management platform can control the chain of custody; business rules module; product order distribution; healthcare and well-being providers and services; and manufacturer, retailer and wholesaler food, product, service providers and others noted herein. A business rules module can identify rules to determine which data module or item to use and the proper sequence. For example, data modules can comprise placing product or service orders; monitoring, reporting or responding to healthcare and well-being generated tag data; product payment services; placing orders for pharmaceutical or medical products or services; and other data disclosed herein. As previously noted, a user can program, select or choose next step data actions and sequences. This platform can provide improved communication and performance throughout the aforementioned food, product, service supply, inventory and order and payment chain by providing improved communication and interaction between a user and differentiated and fragmented products and services by creating an automated and efficient monitoring, reporting and delivery platform.

For example, a tag with a generation or activation technology can be attached to the exterior or interior of a CPG/FMCG container for food or medication to monitor and report: use; location; freshness or expiration dates; reorder a product; or can be incorporated into a garment to monitor a user's heart and respiration rate, blood pressure or breathing activity and activity. The tag or activation technology generates a unique identifier for these products, services or actions which enables appliance/device or network data modules. Activated or generated tag data can automatically enable or activate data modules in an appliance/device or network and next step data actions.

A tag can be configured to create data relationships and connections using tag data generation or activation technologies with a unique identifier corresponding to a tag, generated or activation technology. Next step data actions stored in a data management network or module can be enabled by a code, unique identifier or tag generated or activation technology. A data management network can also control the chain of custody and provide the necessary business rules software program. The business rules software program can be configured to identify the rules to determine data modules or stores and next step data actions to select or activate. For example, next step data actions can include home, retail, wholesale, manufacture, hospitality, industrial, healthcare, agricultural or food/recipe data, information, queries, searches or actions that can more specifically can include: product order placement or fulfilment; product or ambient freshness monitoring, tracking and reporting; ambient air monitoring, tracking and reporting; vital sign, healthcare and well-being monitoring, tracking and reporting; tag data synthetic human speech or text conversion; unique tag signal validation, tag initiated recipe recommendations and ingredient, product, food identification; or marketing data actions as discussed herein; and provide respective next step data action module processing, analysis or conversion as well as other actions and tasks noted herein. Next step data actions can be configured as data modules or stores to provide any of the data, actions, queries or searches required to carry out any appliance/device, garment or network process described herein ("next step data actions").

For example, a home, retailer, wholesaler, manufacturer, hospitality, industrial, healthcare, agricultural or food/recipe transactional database can support next step data actions. A module can be constructed to update the network with data, next step data actions, activation technologies and related serial number and identifiers to ensure secure, authenticated and accurate data and provide search and query functionality. All modules can include deep learning algorithms, AI, neural network or other disclosed interaction, management, query and search for data and to interact, data share and communicate with other modules and provide or initiate data and other next step data actions. A management process or module can update network data modules or databases with data, next step data actions or tag generation or activation technologies and with unique issued serial identifiers. A database manager can also be configured to provide the rules or guidelines to address or edit next step data actions, database or module records that can include an appliance/device application to access or query network, data modules or generated or activation technologies, next step data actions or processes, data conversion or analysis methods, processes or results. An appliance/device or network user can download a tag data application or activate an application using a tag generated or activated application as discussed herein. When an appliance/device scans a tag, generated or activation data or next step data actions it can engage the application to allow an authorized user to query a network for tag data or to register, authorize, edit or cancel a previous data action with an appliance/device application. These actions can also be accomplished using an established user account with a login and secure password as described herein. A user can also query a specific tag identification number, recent activity or history regarding user, account, unique, activated or generated tag signal or data or to edit, amend a user and data or terminate the operation of a tag or account or edit account, user or tag data. Network data access or edits can be configured to provide user or account access confirmations to an appliance/device or secure codes or biometric authorizations to protect network access.

An appliance/device application can be configured to provide tag data, activation technology or data generation results, verification or authentication methods such as voice, text, codes, gps or camera functionalities. As noted, an appliance/device application can be activated to allow a user to review history, voice, image or text messages or next step data actions or provide network or data module searches by text, voice or image.

Figure 3:
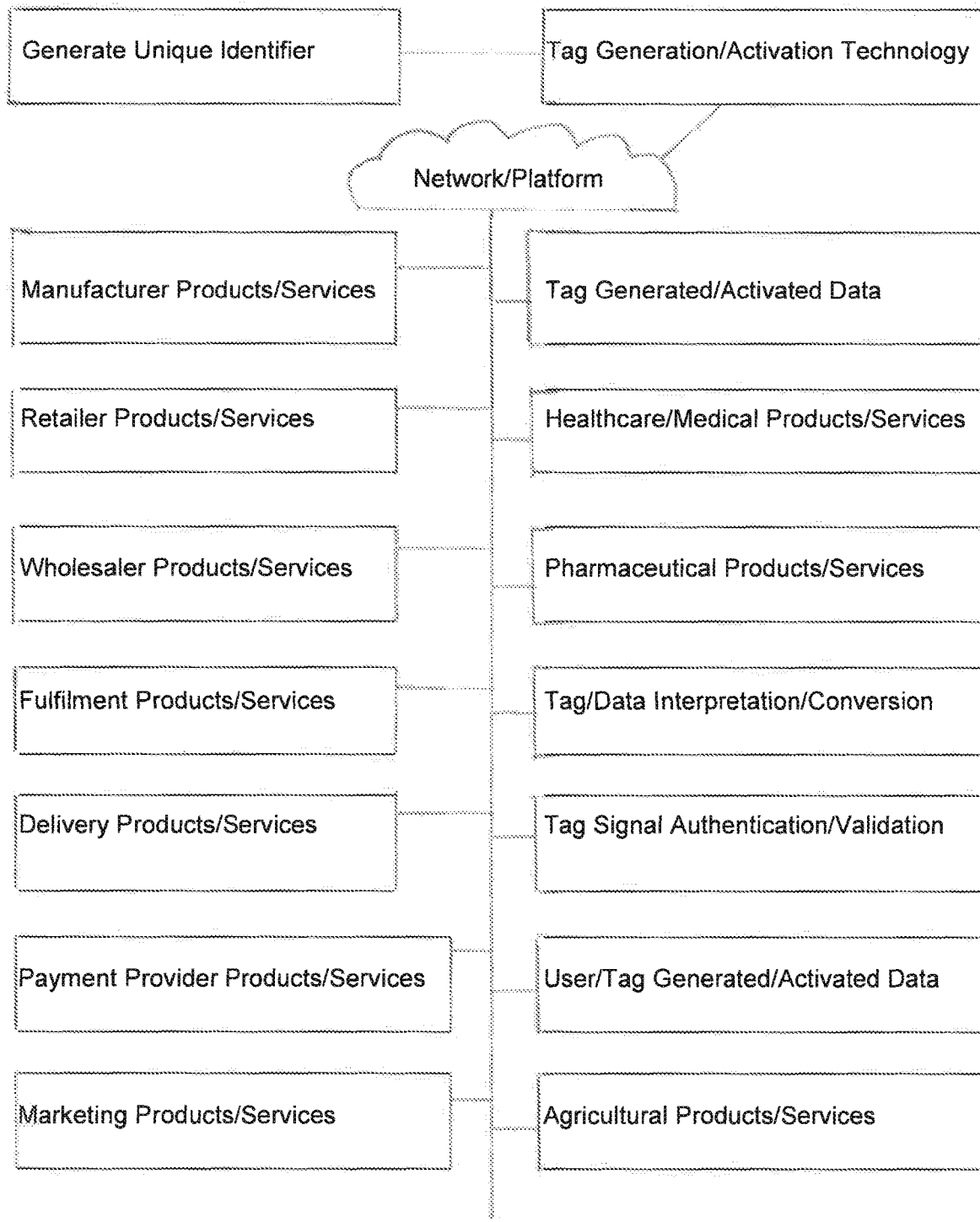
FIG. 3 illustrates a block diagram of a tag network with data modules, stores, servers and databases.
Figure 4:
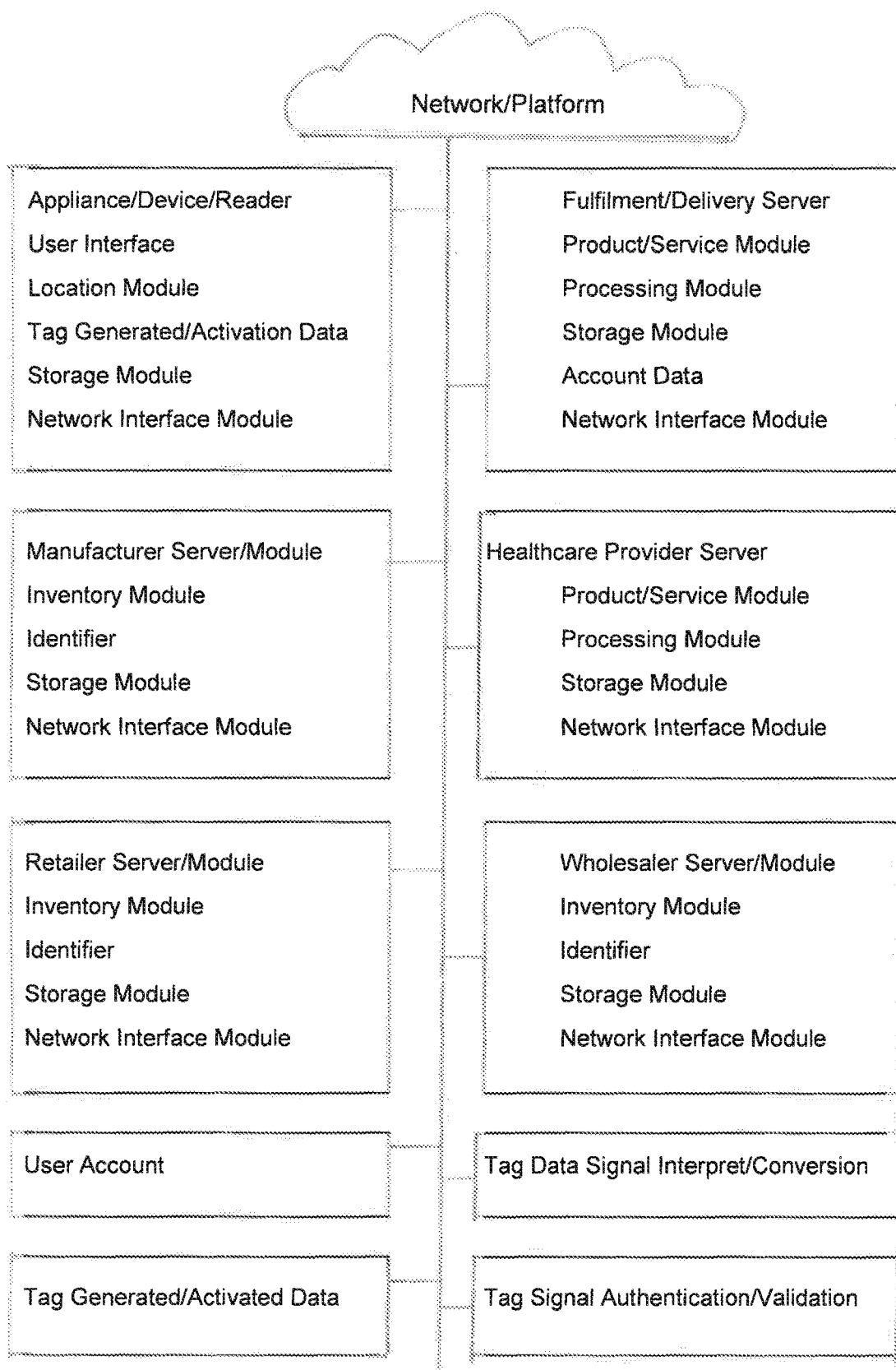
FIG. 4 illustrates a block diagram of a network system according to an embodiment of the present disclosure.
Figure 5:
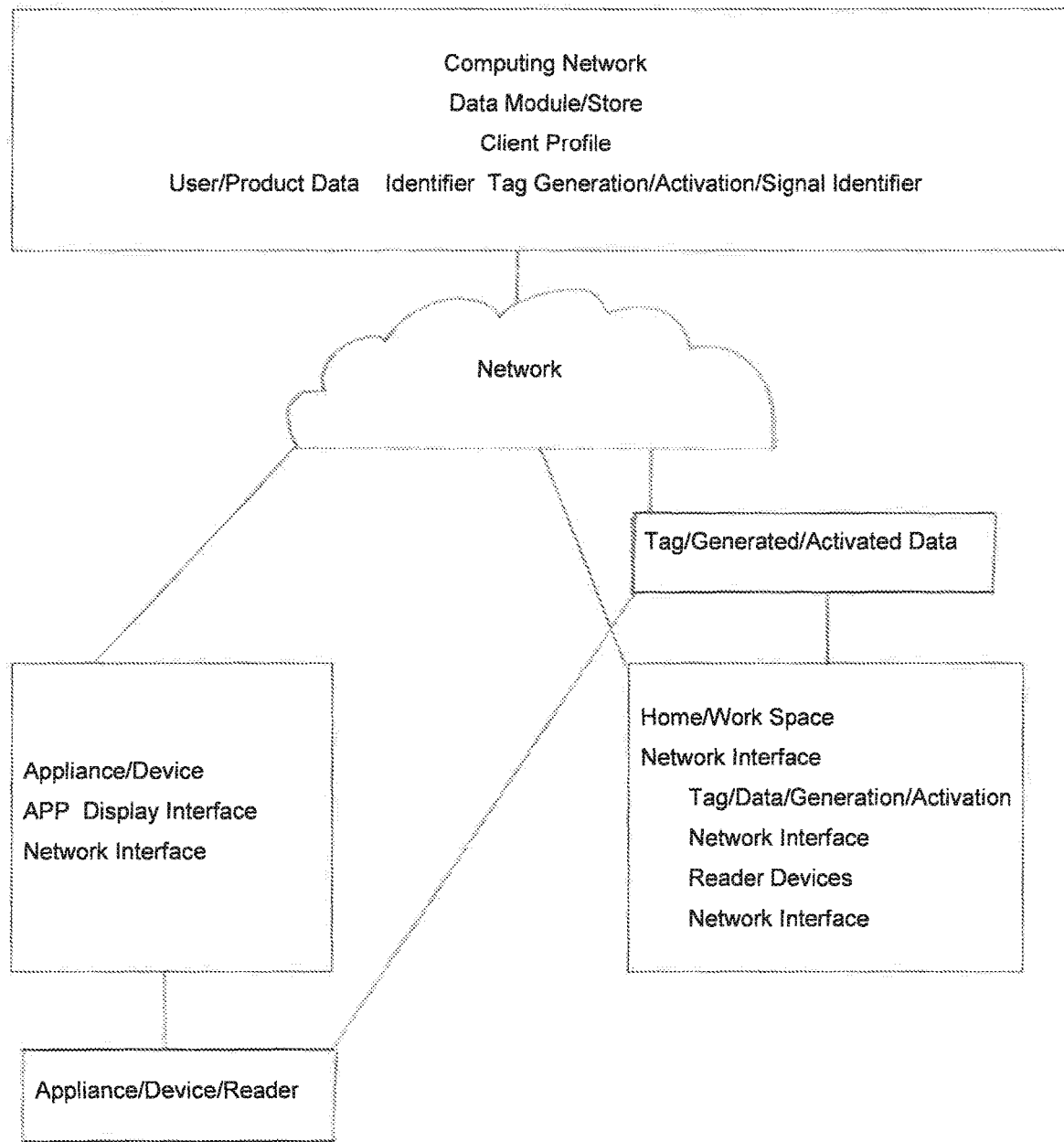
FIG. 5 illustrates a block diagram of a network system according to an embodiment of the present disclosure.

As shown in FIGS. 3 and 4, a tag with generated or activation technology can be incorporated into an appliance/device, garment or container and can generate a unique identifier. Activated or generated tag technology can communicate a unique identifier to a network to enable network data or next step data action modules to process tag activated or generated data.

In another embodiment as depicted in FIGS. 2-7, networks, systems and methods in accordance with the embodiments herein can include the use of a subscription service, internet or network model, to allow CPG/FMCG products to be locally or remotely monitored, controlled and managed using appliance/device or technologies via a network such as the internet in combination with a subscription service or others described herein. A user can establish parameters and controls via a user or network account for an automatic subscription service to provide product/service order placement; fulfilment or delivery; replenishment; upgrade; substitution; replacement or status of products; food and ambient freshness reporting; or body vital sign monitoring and reporting; among others disclosed herein. A system and method can incorporate a network of tags attached to or in communication with FMCG; food; garments; a user; or an appliance/device and configured to provide real-time reporting regarding tag generated or activated data that can include code activated actions, sensor resistivity or signal output change or pulse sensing modulations, among others.

A home or workspace can monitor and track tags for generated or activated tag data that can include pulse sensing, sensor or code activated actions. Appliance/device readers monitoring and tracking tags can create an automated system to also track, monitor or report a user's activity, garment or badge use or location or movement of a specific tag as well as track, monitor, report and provide next step data actions for tag generated or activated data such as food or ambient air freshness, product/service order and fulfilment or user vital sign tracking and reporting. Further, a tag can incorporate any tag or user generation, activation or identifier data disclosure herein and can be embedded or placed into or attached to a user or their body such as under their skin, in a garment or appliance/device.

In one embodiment, internet or network automated product monitoring or replenishment can include a subscription service to facilitate user products, services or purchases by and among manufacturers, retailers or wholesalers. These networks, systems and methods can also provide data collection, data communication, data analysis or tracking of products or services, or combinations thereof, to improve order product placement, automatic replenishment of goods and delivery by using tags. The subscription service can provide numerous services ranging from product order placement, fulfilment or delivery; food freshness monitoring, tracking and reporting; and monitoring, tracking and reporting user vital signs and providing next step data actions and any others noted herein.

By way of example, and as depicted in FIGS. 7-10 and 12, a user may pour a glass of milk and realize the bottle is half empty. The user can locate a tag located at the half-mark of the bottle, remove a tab cover sealing a tag sensor or activation technology so that a sensor reaction to an ambient stimulus can immediately or concurrently change the resistivity or signal output of the tag which is read, analyzed and interpreted to automatically place a purchase order and delivery for the milk container or include the product into a virtual basket/list of goods. The user can then place the container into an appliance or pantry area. Additionally, a user can also remove a tab from a tag to allow a reader to interrogate a tag activation data such as a code or unique product, tag or other identifier, or combination thereof, configured to place a product order and provide other next step data actions described herein. When a user removes a cover from a tag, a data activation technology or sensor reaction can convert into a synthesized human voice or text via an appliance/device or network tag signal voice/text translation module that can be configured to ask "User would you like to reorder the same brand and size milk container or would you like to try a substitute" or "User, your milk has been reordered and should be delivered Tuesday. Would you like an appliance/device confirmation?" If an order is immediately placed, a prior confirmation can be sent to a user via an appliance/device such as a smartphone to accept or decline the purchase, to place the order into a shopping list, search for a substitute or to increase the quantity of the order prior to the order being placed, fulfilled or delivered. In another example, an appliance/device reader can interrogate a tag located on the chest or wrist area of a garment (e.g., pocket or cuff) or bedding located in proximity to body areas to be monitored, tracked and reported to provide user vital sign readings. These tag signals can be converted into synthesized human speech or text to provide a user with heart or respiration rate, blood pressure, breath effort, among others, by transmitting the data to the appropriate appliance/device or network data modules to be processed.

In another embodiment an appliance/device, garment, technology or reader in communication with a network can be configured to process or to interpret the resistivity level, signal output change or modulations of a tag or a sensor portion to activate next step data actions. These tag signals or changes can be processed and converted into or can generate a synthesized human voice or text response via an appliance/device, garment, technology or network by using tag signal to voice/speech or text conversion/recognition to represent the actions or next step data actions which can include automatically placing a product/service order, fulfillment or delivery; placing a product/service into a virtual shopping list or opening a product order placement, marketing or other landing page; providing product, food or ambient freshness reports, food or container shelf-life projections, absence or availability updates; or generating a voice/text response or query to a user regarding said actions or next step data actions or combinations thereof, among others.

Figure 11:
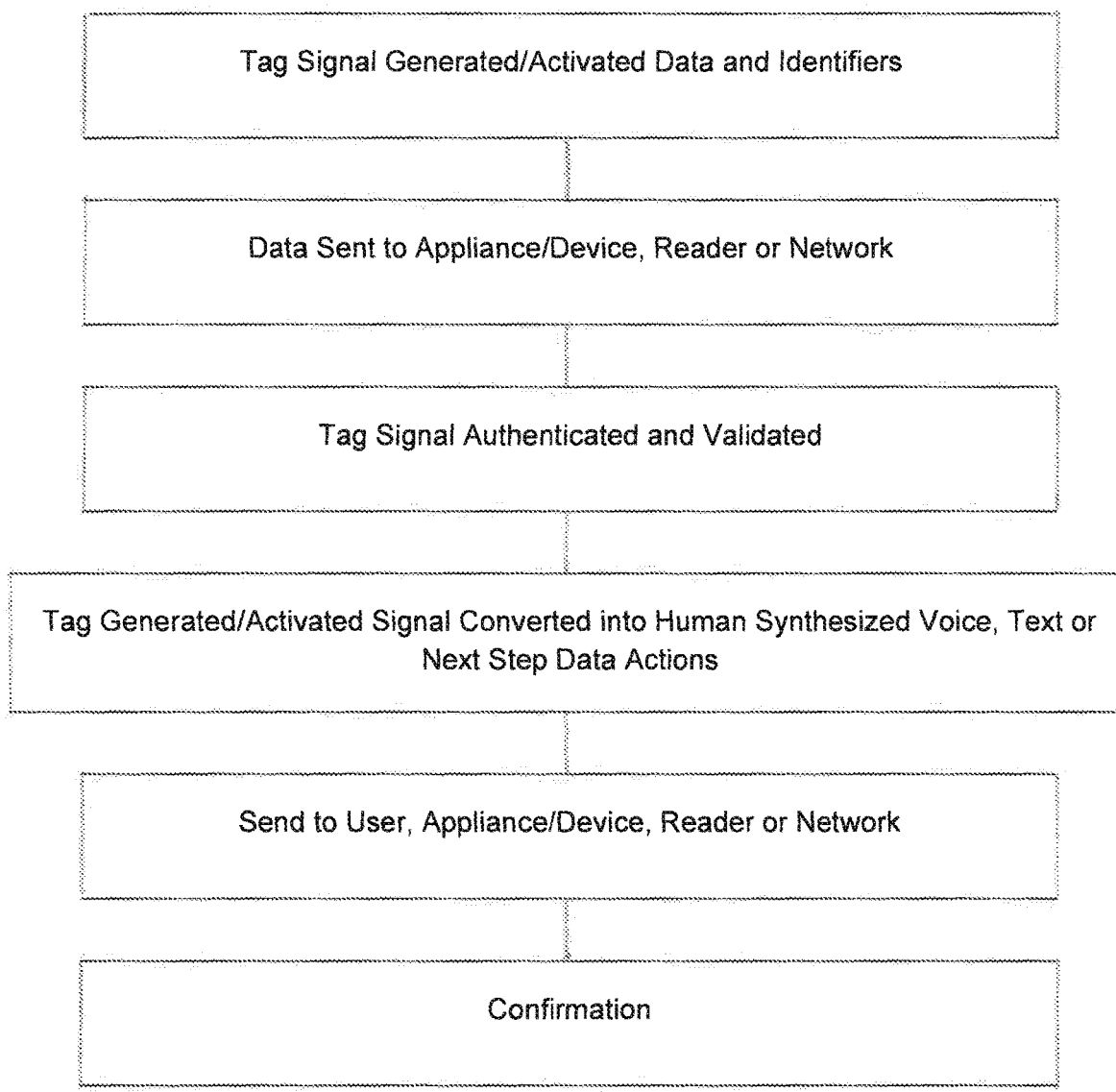
FIG. 11 illustrates a block diagram for a tag signal conversion method.
Figure 12:
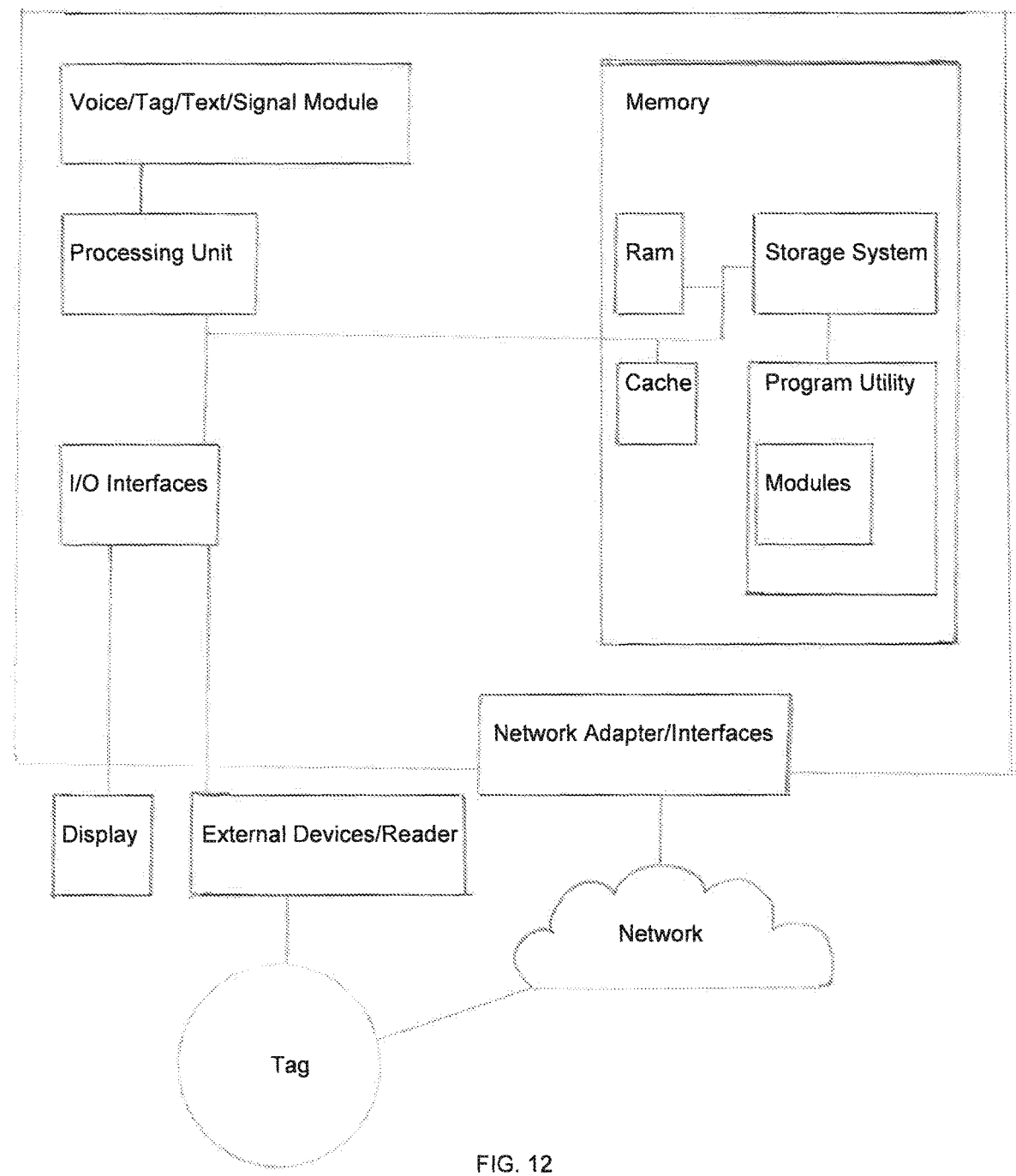
FIG. 12 illustrates a block diagram for an appliance/device or network system.

For example, as shown in FIG. 11, a generated or activated tag data or signal conversion process can enable a tag on a CPG/FMCG container or food item, garment or tag attached to a user to be converted into synthesized human speech or text by providing a pre-recorded, voice activated or generated synthesized human voice or text notice, message, recommendations or suggestions that can provide notice that a food item is spoiled or has a defined remaining shelf-life, provide notice a product is absent, available or has been ordered and request a verbal, texted or other interface order confirmation or that a user's heart rate or other vital signs are elevated and provide user suggestions, recommendations or an emergency request/response or event specific contacts. Tag generated synthesized human speech or text enables voice recognition and human speech engagement to create dialog and conversation between a generated, activated, detected or changed tag signal, status, event or next step data action with a user and can provide an appliance/device, garment, container, technology or network and data module recommendations, suggestions, orders or contacts regarding generated, activated, detected or changed tag signals, status or events by automatically connecting a user to a product, service or provider via appliance/device or network data modules.

For example, in one embodiment, a tag data interface can be configured to provide real-time entry and interactive prompts such as an analog/digital signal to convert tag signals to digital patterns and be decoded or recognized by template-matching or feature analysis. Tag generation or activation data can communicate or transmit to a software program or it can activate a range of appliance/device, garment or network analysis or conversion operations or processes that can integrate with data modules and next step data actions. This process allows tag generated, activated or next step data actions in real-time to transfer, communicate and convert electronically transmittable signals or data into synthesized human speech or text to create tag data user interactions with products, services, providers, marketing and other data modules as described herein.

For example, a method for tracking freshness or expiration dates of food or containers can include attaching tags to a food or container and placing them into a storage area. Tags can include unique data relating to tag, technology, food or container data or identifiers. Data can also include food or container identification data, freshness data, expiration date or container open date data. An appliance/device reader can interrogate tags and store the data on an appliance/device or network and retrieve relevant container open/close freshness or food data from a network and can also convert the data into synthesized human speech or text that can be stored as a message, retrieved by a user when providing a trigger word or speaking to a speaker or enable an appliance/device or notify a user at a predetermined time that a food or container is expired or not fresh.

Tag generation, activation and structures discussed herein are configured to function with an appliance/device, garment, container, network and a smart speaker embodiment disclosed herein. Smart speakers are designed to perform tasks or services using voice engagement and interaction with a user. A smart speaker can be activated when a trigger word or a conversation or words are detected. Once detected, user verbal queries or commands, in some cases following a trigger word, are captured and sent to a remote or network service for interpretation and user input results. See for example, Patent Application No. 20180260680, which is incorporated herein by reference in its entirety.

Figure 13:
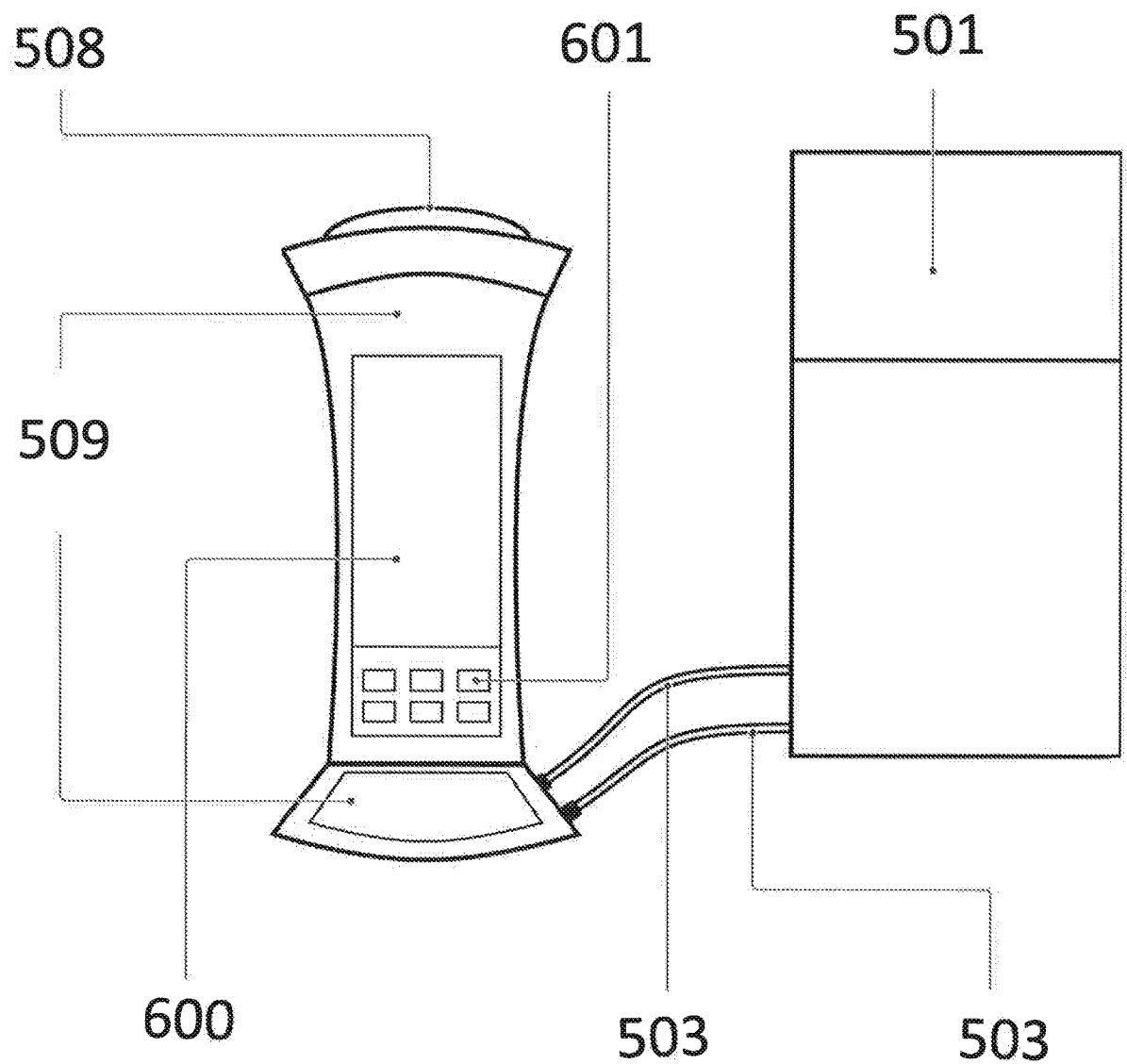
FIG. 13 illustrates a front view of a smart speaker system.
Figure 14:
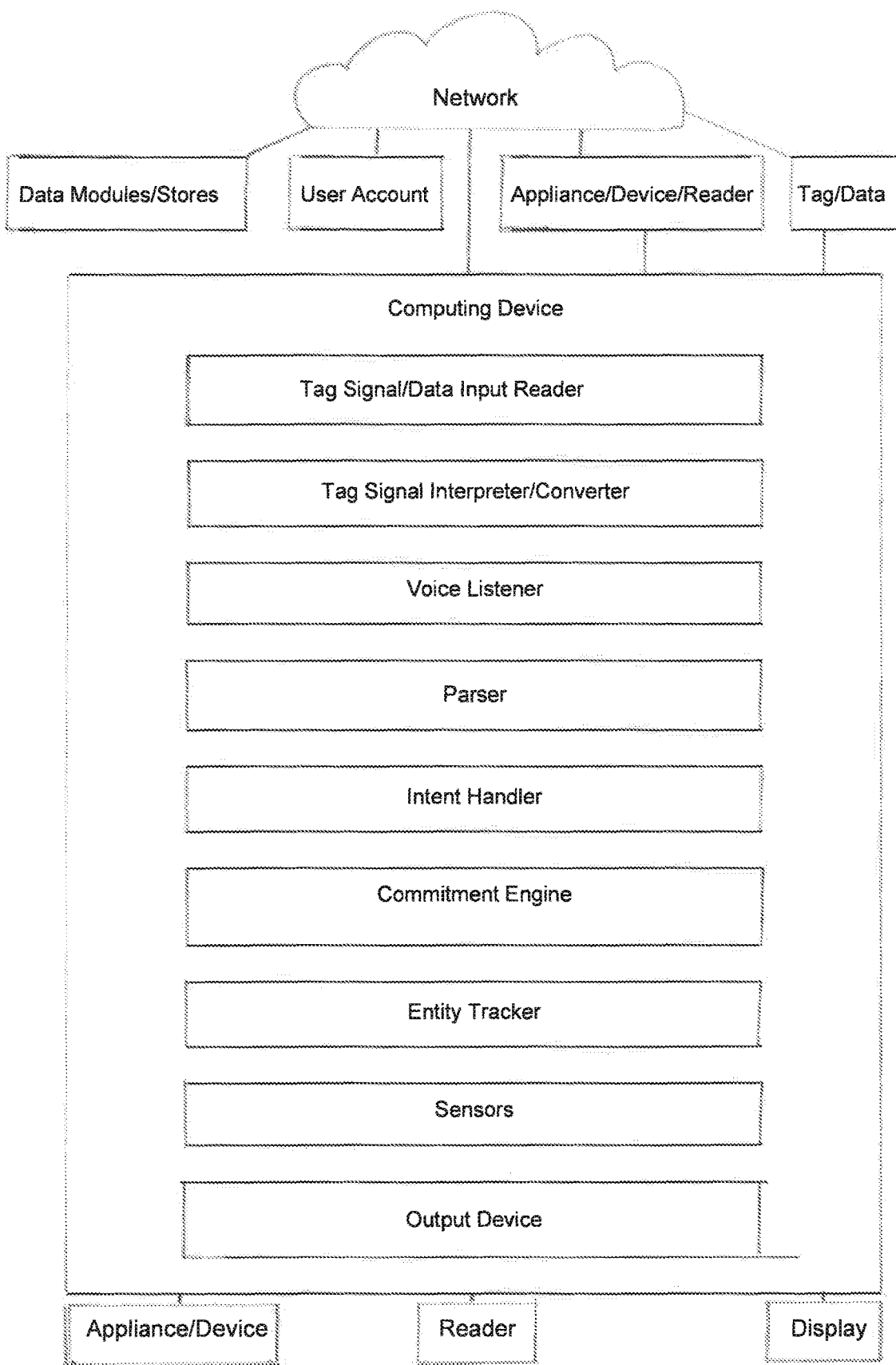
FIG. 14 illustrates a block diagram for an appliance/device, smart speaker or network system.
Figure 15:
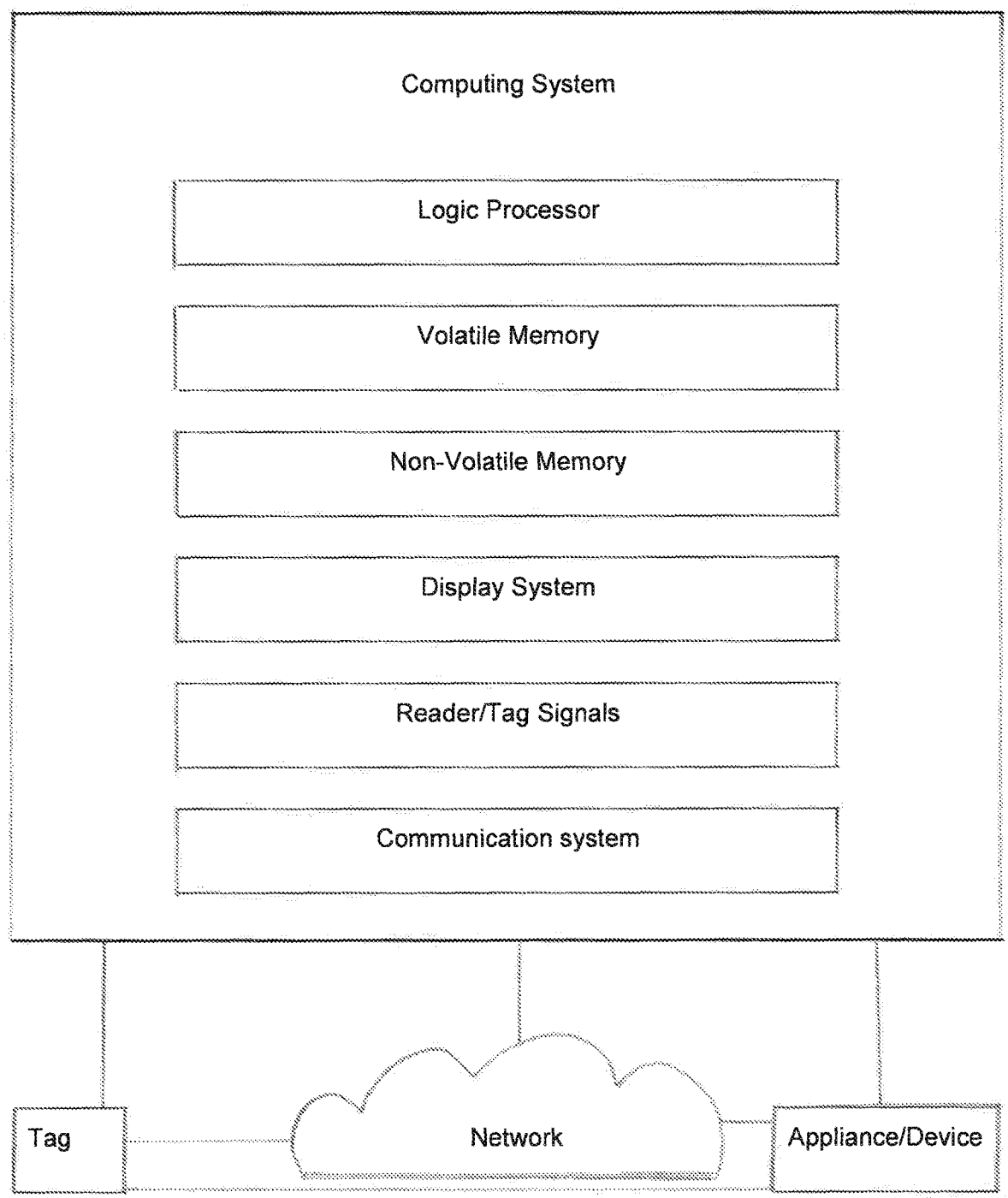
FIG. 15 illustrates a block diagram for an appliance/device, smart speaker or network system.

FIGS. 13-15 depict a smart speaker or functionality integrated into an appliance/device ("speaker") that can communicate with, connect to or incorporate a tag reader with an appropriate interface to a speaker operating system or remote network in communication with said speaker. In this embodiment, a speaker can be configured to perform tasks or services from received tag signals that can be converted into synthesized human speech or text to provide voice engagement and interaction by, between and among a user, a tag, generated or activated data, a smart speaker and suggested or next step data actions and appliance/device or network data modules, or combinations thereof. A speaker can be activated when it detects or receives certain generated or activated tag data signals which can function as trigger words, if necessary, or next step data actions. Once detected and received, tag signals can be analyzed and processed into synthesized human speech/text or into suggested or next step data actions that can also be converted into verbal queries or commands to engage or interact with and among a user, tag and speaker. A speaker can also be configured to display a tag signal result or next step data action onto an appliance/device display or television or can send a result to a user or an appliance/device via voice message, text, graphically, numerically or image, or combinations thereof. A tag signal, text or audio input can be processed locally or remotely and in one instance can validate a tag generated or activated signal via unique tag, product or code identifiers to allow or authorize data conversion or initiate next step data actions. A speaker can be configured to ask or provide a voice acknowledgement each time tag data is generated, activated or next step data actions are initiated such as when a tag signal is received, a product order is placed, when a tag is identified as absent or when a product order is activated by a code, tag or product or other unique identifier. A speaker can also be configured with a trigger word, command or sound to cause a connected or speaker in communication with a reader to scan for tags and generated or activated data and confirm receiving said data. A speaker can also function without the use of trigger words with a user engaging a speaker with commands, words or conversation.

Provided in FIG. 13 is a speaker configured to communicate with or incorporate an embedded reader module to scan and read tag generated or activated data to: locate, monitor and report goods or items; provide product, food or container freshness levels; container or food shelf-life projections; product absence or availability updates; monitor and report ambient air quality; monitor, track or report body vital signs; generate voice response or user queries regarding tag signals or data generated, activated or next step data actions, among others. Furthermore, a smart speaker can be configured to convert generated, activated or next step data actions into user voice or text responses and queries depending upon the context. A speaker can also be configured to detect or read stored or generated tag data and to interpret output information in a radio frequency regime; for example, frequency, frequency shift, signal intensity, or other detectable or sine based information or data. In certain embodiments, a method can include detecting an output of the radio frequency identification by a reader. A reader can connect to or communicate with an appliance/device, container, garment, user or network or other computing device with algorithms, software, neural network, AI, data modules or instructions to compute, analyze, process, compare and respond to the provided, queried or generated data locally or remotely via a network, internet, cloud, edge computing or other similar network and network interfaces or combinations thereof.

FIG. 14 shows an example of an appliance/device or speaker that can incorporate components of a speaker system and connect to a network or another appliance/device, container, user, garment or technology. A speaker in communication with an appliance/device, tag, container, product, user, garment or network can connect or communicate with user data modules or stores and data stored or provided in a user account, profile or an appliance/device as discussed herein. A speaker can include a tag, a tag reader, sensor, voice listener, parser, intent handler, commitment engine, entity tracker and an output device. A sensor can include a microphone to receive natural language inputs or signals from a user or appliance/device, signals and a reader to receive tag generated or activated data signals and corresponding next step data actions.

A reader, signal data conversion module, voice listener, parser and intent handler can work together or in combination to convert natural language inputs or tag signal inputs into synthesized natural language or text and into next step data actions or commitments that can be executed by a speaker, appliance/device or network. A reader can interrogate a tag for generated or activated data signals and store said data locally or remotely. A commitment engine stores commitments in commitment storage. An entity tracker can provide context information for a tag signal or commitment engine and/or other data modules. A user or a tag can initiate or at a contextually appropriate time a commitment engine can execute a commitment or next step data action and provide output, such as tag to audio signals or text, among others.

FIGS. 14-15 provide examples of a remote service providing tag generated or activated data conversion into synthesized natural speech, text or natural language processing of a speaker system. In one example, a tag reader or signal converter, voice listener, parser, intent handler, entity tracker and commitment engine are disposed in an appliance/device or network. Tag or sensor generated or activated data from a tag, generated or activated data technology or a user device can communicate to an appliance/device, network or data modules. In another embodiment, data can be provided locally by an appliance/device. In one embodiment, tag generated or activated data from a user, appliance/device, container, food item or garment can be interrogated by a speaker and transmit the appropriate data and next step data actions to analyze, process or convert said data.

FIG. 15 depicts an embodiment of a computing system that can provide a method or process described herein. An appliance/device or computing system can include a logic processor, volatile memory and a non-volatile storage device. A system can also include a reader, a tag, a display, input and communication system, among others. A logic processor can include an appliance/device or network configured to execute instructions and a volatile memory can include an appliance/device that can include random access memory. Furthermore, a non-volatile storage device can include an appliance/device or network configured to hold instructions executable by a logic processor to implement the methods or processes described herein.

Figure 16:
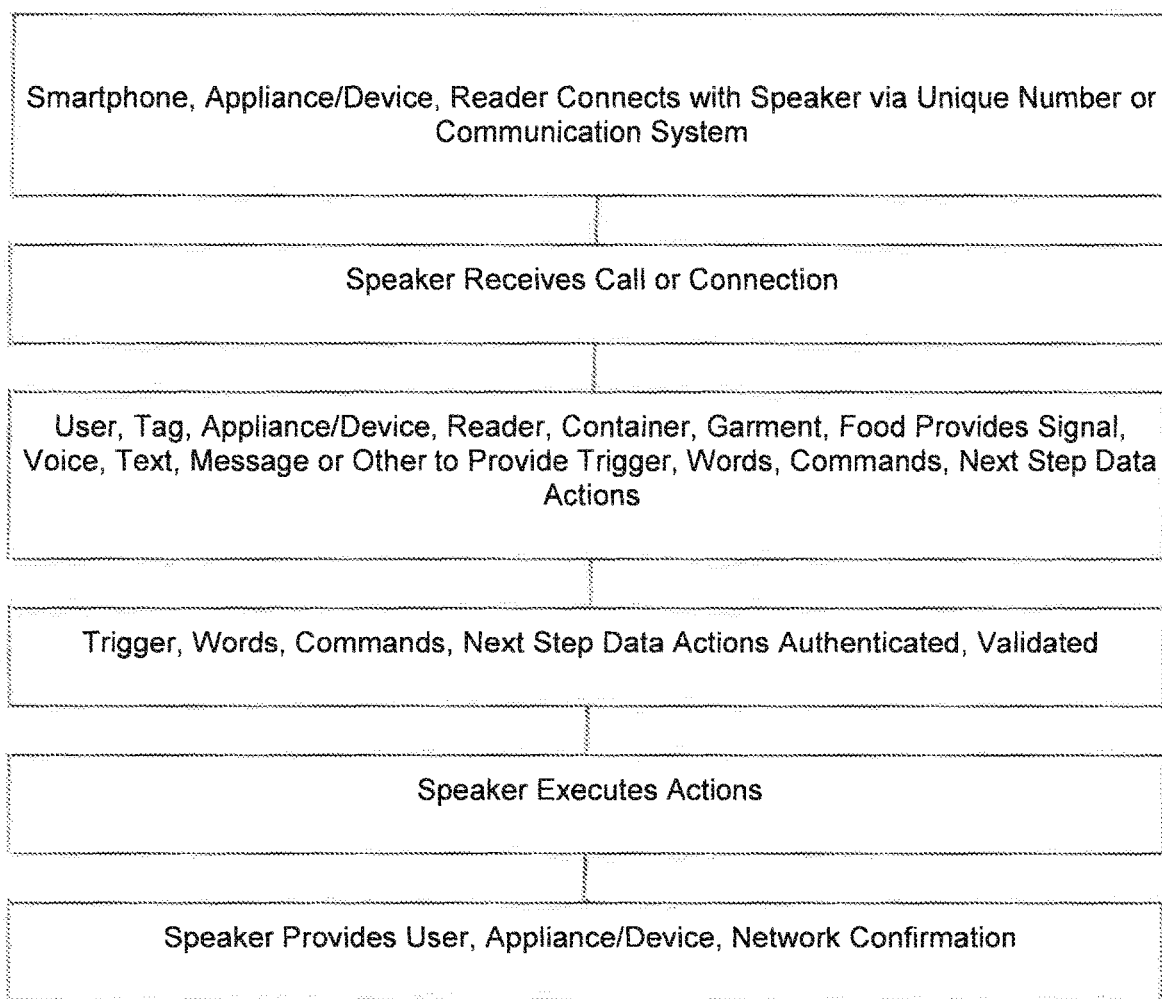
FIG. 16 illustrates a block diagram for an appliance/device, smart speaker or network communication method or system.

A speaker can incorporate a function or mode to store or segregate unique user or event data, converted synthesized human speech, text, graphical, numeric or tag data or next step data actions and provide discrete user access or contextually appropriate data sharing. In one embodiment, a speaker can connect to, communicate with or incorporate an indicator light located on the front panel of a speaker or on any other visible area. An indicator light can activate when a speaker or network provides, stores or queues unique user data or when a user shares data with multiple users such as a specific or general message, record, user or event data in response to a user query or related data or via generated or activated tag data, results or reporting or next step data actions. For example, a speaker indicator light can activate in a color to notify a user there are pending tag product purchase orders or virtual basket orders that require a user's voice or text confirmation or an order page confirmation prior to authorizing placement; recent or historical vital sign indicators, levels or reports to review; confirmations of online purchases/services and follow-up items such as additional, missing data or information queries or calendar alerts such as meetings or events, among others. Different activated light colors can represent unique data meanings allowing a user to see an activated speaker light and provide an access or trigger word to the speaker to share relevant data. Further, a flashing light can notify a user of an emergency or can flash to confirm receipt of a tag or purchase order, trigger word, command or next step data action. Data can be stored for each user locally or remotely. For example, when a user observes an activated light the user can speak their name as a trigger word, command or access. The speaker can then authenticate the user's voice and respond by saying "Hello User 1, you do not have any messages or pending purchase orders" or "Hello User 1, you have no actions" or the speaker may respond by saying "Hello User 1, User 2 left you a message and you have 2 purchases you need to authorize. Would you like to hear the message or authorize your purchases or do it later?" A user can respond accordingly. Furthermore, a speaker integrating voice recognition software can identify a user and provide the aforementioned materials. As shown in FIG. 16, a speaker can incorporate an interface to connect or communicate with a telephone number as discussed herein so that an authorized user can call, message or text to connect and communicate with a speaker using an appliance/device to provide voice or text commands to request information, receive stored messages or information, unique user data or to activate or adjust connected or communicated smart home appliances/devices or technologies. Furthermore, a user or tag can provide group or family messages using a speaker as a digital voice bulletin board or forward messages or data to participating user's appliance/device. A speaker can be configured to send or forward any tag, camera, phone or voice generated or activated data or message received, converted or stored with a speaker to any and all authorized and participating users via voice-to-text, voice-to-voice or image, or combinations thereof, to an appliance/device messaging, display, among others, which can include next step data actions.

In another example, a speaker can provide discrete user data sharing. For example, a speaker reader can interrogate a tag for generated or activated data with a speaker configured to only share certain interrogated tag data in the form of voice or text with a user's appliance/device and not with the speaker voice interaction or engagement functionality. A speaker healthcare mode can interrogate a user's garment or a tag configured to read body vital signs and to restrict sharing the data to a user's appliance/device. In this example, a user can be provided data access and a data restriction so data is only shared with a user's appliance/device. Furthermore, a user can access or receive data with an appliance/device or smartphone that does not integrate a reader.

In another example, a speaker in a healthcare mode, as previously noted, can be configured to provide a user with tag body vital sign data. A reader can be configured to provide generated or activated tag data with a restricted data sharing setting to provide the data only to a user, caretaker or doctor. Another tag data sharing setting can allow data to be shared with speaker voice engagement and interaction activation functionality so tag data can be converted into synthesized human speech or text and shared with a user or appliance/device. A speaker or reader can also be configured to share certain data and threshold levels or ranges with authorized users. For example, a user can elect an option on a speaker, appliance/device, network or healthcare account or application to transmit certain body vital sign data, in a certain range or level, to a specific user and provide that all other vital sign ranges or levels outside of certain thresholds transmit automatically to select family, caregiver, doctor or emergency services via voice-to-voice, voice-to-text or image/video, among others. For example, body vital sign ranges, levels or thresholds can be designated good, fair, serious or critical and user notifications can be based on these or similar health status designations. As previously noted, a speaker can activate a flashing light or siren or other alerting noise to notify of an emergency with immediate user action required. Furthermore, a speaker can also provide notice to a family member, caregiver, doctor or other via an appliance/device, as previously noted, or that a user is not properly using or allowing a tag to monitor, track or report body vital signs such as when no signal is received or reported or can send user notices when conflicting or anomalous historical or comparative user data is generated or collected that can indicate mismatched or incorrect tag or garment usage.

As previously noted, in one embodiment, a tag can be configured to generate or activate data and next step data actions. In one embodiment, the present embodiment can provide a method and system for a multimodal remote speaker healthcare monitoring system or network. The system can include a sensing/NCS tag that can be placed in proximity to a user; attached to a user; or attached, embedded or sewn into a user's garment or bedsheets, among others. A tag can be configured to generate signals to detect body vital sign data from a user that are interpreted with software, algorithms, AI or neural networks. Single or multiple tags can connect to or communicate with a user to generate data when placed in proximity to chest, arm, wrists, head/eyes, neck, joints, abdomen/stomach or any other body or tissue area intended for monitoring and data generation. A speaker healthcare monitoring system can provide benefits to any user; especially, remote well-being or healthcare monitoring of seniors, users with disabilities, patients and individuals with existing conditions, pre-post-natal or fetal monitoring and sleep tracking, monitoring and reporting. A speaker healthcare monitoring system can include a reader configured to interrogate tag generated or activated data which can also include automatic product ordering or delivery, food freshness monitoring and reporting, physical location sensing and body vital sign reporting. Generated or activated tag data can be sent to an appliance/device or network to interpret and analyze data which can be displayed on an appliance/device display or sent to other authorized appliances/devices for caregivers, doctors, contacts, users, providers or others described herein. In another embodiment, tag data can be managed, processed or analyzed by a speaker with a software-defined radio (SDR) integrating a microcontroller embedded in the speaker or via a proxy device. In yet another embodiment, an appliance/device, reader or a reader embedded into a speaker, as previously discussed, can be configured to convert tag signals and activation data, such as executable code or unique identifiers, into synthesized human speech, text, numeric or graphics, or combinations thereof, to identify a user, provide verbal body vital sign data to a user appliance/device or to engage a user with text or speech/verbal queries and responses regarding the data. Data processing and analysis can be provided locally or remotely via a network. Generated or activated tag data and a speaker can connect to or communicate with a healthcare server, network or data modules for data storage and user information management or with an appliance/device, medicine cabinet, pantry or network healthcare data modules and next step data actions. As previously noted, tags can be placed in close proximity or attached to a user; attached, embedded or sewn into a garment or bedding or disposed, attached or embedded into a band, strap, harness, smart watch band, automobile chest seat belt or any other type device ("tag connectors").

Further, a position tracking or human activity recognition ("har") device or sensor can also be incorporated and in communication with tag connectors and incorporated into a monitoring and tracking platform in communication with tag generated or activated data and next step actions. Continuous user monitoring activities can detect or anticipate unsafe situations such as falls, among others. The present embodiment can also include a vision-based recognition system using a camera in communication with a speaker or tag connector to record video sequences and to recognize user activities by combining images with computer vision algorithms. Another embodiment can include a radio-based recognition system that can implement ZigBee, WiFi or tags to anticipate or detect human mobility issues. Another embodiment can integrate a sensor recognition-based system that can incorporate micro-electromechanical systems ("mems") sensor technologies such as an accelerometer, gyroscope, barometric or magnetometer to detect and anticipate body movements. In one embodiment mems can combine an accelerometer with a gyroscope and be configured to recognize user fall detection or gait analysis, among others. Tags and indoor positioning technologies and sensors as previously noted can be combined into a garment or tag connector to track, monitor and report a user's body vital signs, physical position and activity by connecting and communicating with a speaker healthcare data management or network.

Continuing, a tag can generate data and transmit these signals to a speaker as noted herein. An appliance/device or speaker can provide local data processing, compression or storage for certain data processing applications and can transmit data to an appliance/device, healthcare server or network via the Internet or network and related data modules. As previously discussed, depending upon the data level, range or threshold the data can be sent to a user, caregiver, doctor, hospital, emergency service, provider or other appliance/device. A speaker can also be configured to provide video monitoring as noted or a communication service connecting to an appliance/device or television display to facilitate communication and data sharing with a user, caregiver, doctor or provider.

User, tag, garment or tag connector identifiers or information can be provided for each user. A user can connect or communicate with one or more tags or position sensing devices. User information can be manually entered into a user appliance/device or speaker application, account or other computing device using a unique username or password to identify a user and tag or sensing device in one embodiment. In another embodiment, a tag or combined tag functionality can provide a speaker, appliance/device or other computing device account or application activation with an executable code or other activation data to automatically open an account, application or registration page to provide basic user data with voice or text that can include integration of an appliance/device camera or scanner to scan tag, garment or tag connectors that incorporate a quick response (QR) or bar code, or any other code disclosed herein, or use voice and voice prompts to complete required account information, editing or modifications to associate a tag and usage with a user to allow tracking, monitoring and reporting of generated tag body vital sign data. A system can also provide any combinations of the aforementioned.

A remote speaker healthcare monitoring platform can function as a continuously operating and real-time data generating, gathering, analysis and response network, subscription or service. In one embodiment, an application can activate a user login page. A user can also open/close or connect/disconnect an activation tag or device as discussed herein to initiate a user login or use an appliance/device or smartphone camera or system scanner to input a QR, bar or other code from a user tag, garment, tag connector or position sensing devices which can also activate an application or user program. Speaker or appliance/device applications, programs, menus or modules can be accessed via appliance/device, voice, text or display. For example, a speaker or appliance/device voice or main menu can include a "Health" or "Product/Food" or "Medication/Emergencies" or "Comments" menu, combinations or others. A Product/Food section can include scanned or read tag available products or food inventory in a refrigerator, pantry or medicine cabinet and provide food or container freshness levels as well as projected shelf-life. Users can access and review placed virtual or pending product shopping lists and anticipated delivery times/dates. A user can access this section to modify, cancel or place product/service purchase orders. Multiple authorized users can access a user profile or page to allow a caregiver or family member to monitor the well-being of a user and also place services or product orders with deliveries. A Medication section can provide current and historical medication usage, availability and comments regarding usage, side effects, etc. As noted in the Product/Food section, medications can be ordered, delivered with monitored usage. An Emergencies section can provide recent or historical medical issues such as incidents, emergency room or treatments, among others. A Comments section can provide recent or historical family, caregiver or doctor observations regarding well-being, eating, general habits, discomforts and other health or well-being observations. A "Health" menu can provide numerous sections. A "Health Tracker" module can be configured to generate and gather data for heart rate, blood pressure, respiration rate, breathing activity or effort and pre-post-natal or fetal monitoring and to display data with voice, text, numerically or graphically with individual rates, levels, thresholds or combined data, comparative data for age, health, weight, height or conditions, vital statistics and medical history and historical user data and with other related information and provide a data share option to transmit data to other user appliances/devices. A "Health Data" module can provide a user's records for activity data, heart rate, blood pressure, respiration rate, breathing activity and pre-post-natal data and also provide self or auto-diagnosis data. A "Speaker Setting" module can allow a user to verify proper and correct tag usage, set and adjust user and automatic health or contact notifications such as health, caregiver, doctor, hospital or emergency or other. A "Health Contact" module can allow a user a quick connect to communicate with family, a caregiver, doctor or other using text, speech or camera. Other modules can be created or added depending upon a user's needs and user questions regarding generated or gathered data can be queried to a speaker with voice or text via the speaker function. Generated or gathered healthcare data can be remotely accessed by authorized users to receive, save or manage data files via a network for each user, among others. Caregivers, doctors or other authorized users can read or analyze the generated, activated or gathered data to provide diagnostic information or advice to a user, family member or caregiver. Any time account data is edited or changed a voice or text message and confirmation can be sent to a user. Any disclosure herein or combinations thereof can be incorporated into a speaker healthcare platform, a speaker, appliance/device or technology. A healthcare platform as noted can be used via an appliance/device application. Furthermore, this healthcare model can also be implemented as an agricultural data module or store and used to monitor animals such as cattle, pigs, horses, chickens, etc., and monitor chicken egg laying and animal gestation or pregnancies, etc. In one example, a GPS sensor or system in communication with a speaker healthcare platform can attach to a collar and include a tag and a reader, or combinations thereof to track, monitor and report animal health. In another example, tags can be attached to a user and a reader carried or attached to an appliance/device, drone, dog, llama or other that can monitor a user or animals.

Also disclosed is a method and system for the use of multiple brand logos or names and communicative indicia on a tag, garment, healthcare speaker or platform, appliance/device, technology, food item, container or product packaging ("product") wherein at least one of the brand logos or names (such as a secondary or tertiary brand logo or name) can be used to represent unique, different or distinct products, services or benefits from the primary brand logo or name. Secondary or tertiary brand logos or names can communicate to consumers either an enhanced, unexpected or unseen use or benefit for a product that can include a benefit such as a product/service order placement, fulfilment or delivery; tracking, monitoring or reporting product freshness and projected shelf-life; tracking, monitoring or reporting body vital signs; processing a purchase order payment; or providing vital sign related recipes with respective next step data actions.

A method and system is provided to manufacture, package, market or sell an appliance/device, garment, healthcare speaker, container or platform and a method and system that can be used with the tag embodiments described herein and to provide consumers with product packaging that includes technologies, communicative indicia, text or tags to effectively and immediately communicate to a user specific primary, secondary or tertiary benefits such as benefits regarding technologies, usages, interaction and communication, advantages, product availability and complementary usage with an appliance/device or product and consumer goods by using minimal surface area on said product packaging and a method and system to provide user product packaging information regarding an appliance/device or consumer goods to effectively and immediately communicate specific primary, secondary or tertiary advantages or benefits of an appliance or container a technology.

For example, a combined primary, secondary or tertiary brand logo or name descriptor can include the use of any of the following communicative indicia or text to form a benefits descriptor and association and in any combination hereof or as disclosed herein:

[primary brand logo or name]
[combined description of association or inter-relation]
[secondary brand logo or name]
or
[tertiary brand logo or name]

For example, a product or packaging can include a primary brand logo or name which includes a product with a technology and a secondary or tertiary brand logo or name or icon for any of the following: a healthcare speaker or network, container, an appliance/device, garment, a smartphone, speaker, beacon, tag, user interface, a retail grocery store, food distribution, delivery or service company such as an internet, cloud or product provider or any others disclosed herein. A logo and brand name for an appliance/device, garment or technology immediately informs a consumer that there are additional non-obvious or unseen benefits associated with a product, container or technology and a logo for a food distribution channel such as a retail grocery store or a cloud service, immediately informs a consumer of same or other similar type product availability and that this information can be located, read, downloaded or accessed in whole, part or additionally provided via a tag and accessed with a reader enabled appliance/device or network. In another example a garment can incorporate tags to generate body vital sign data that can include a brand logo or name for a tag, healthcare speaker or network, a speaker, appliance/device, phone or network service with a reader that can interrogate said tags to provide user bodily vital sign data. This can also be used for pre-post-natal or baby garments and clothing such as bedding, diapers or children/baby clothes. Brand logos or names or any combinations of the aforementioned products, services or technologies can be combined.

Figure 17:
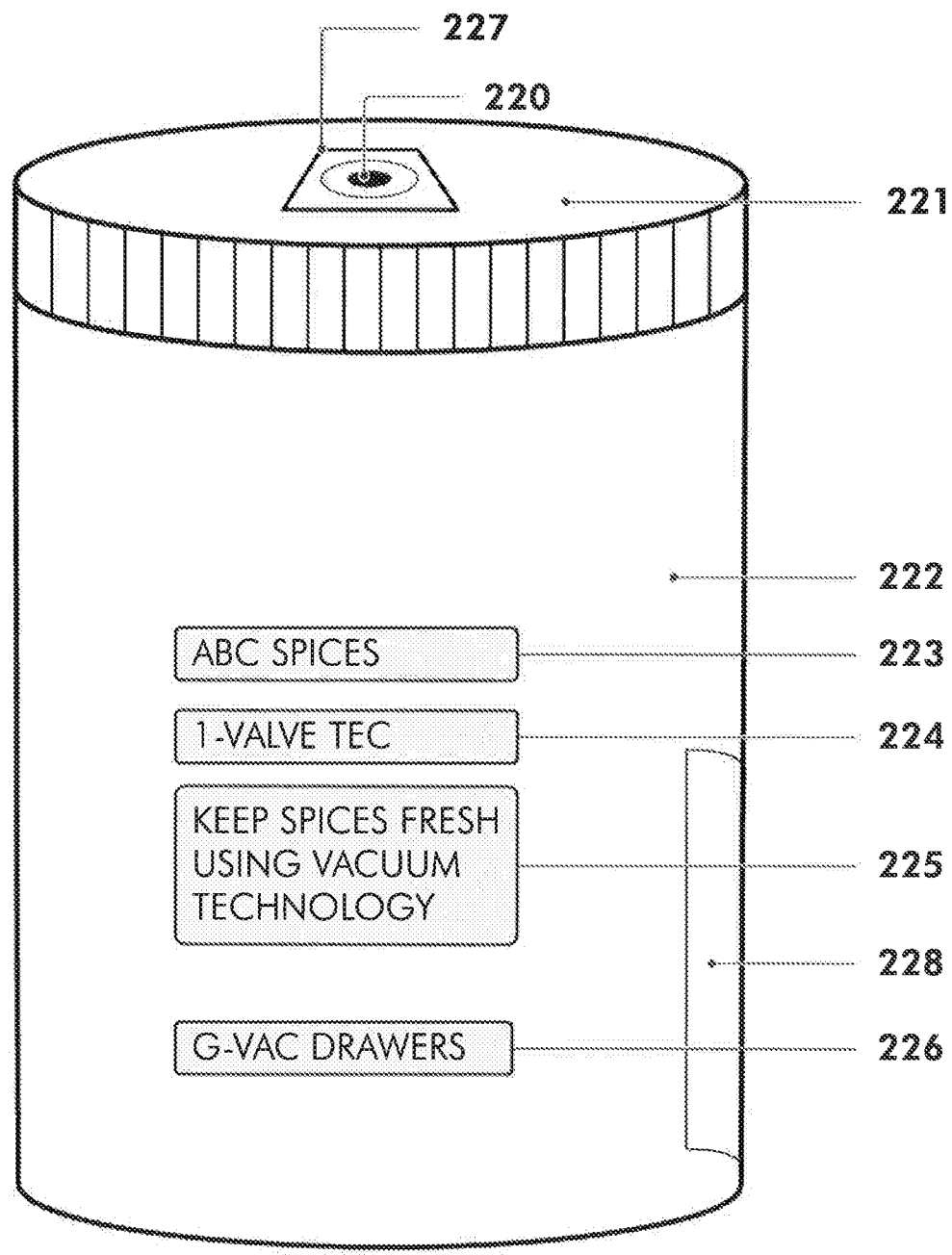
FIG. 17 illustrates a perishable food or item inside a container with a container technology and brand logos or names.

FIG. 17 depicts an embodiment of a product inside a container with a technology and brand logos and names. A sealable container 222 is provided with a cover 221 disposed thereon. The cover can include a one-way valve 220 to allow air to be evacuated from inside said container when a vacuum is applied to it to create a vacuum environment therein. An adhesive, film or plastic material 227 can cover the one-way valve to protect the valve and container contents and can be removed to allow a vacuum environment to be created inside said container. A tag 228, or a combination of tags, as described in the embodiments herein, can communicate or connect with each other, as well as for any of the other embodiments described herein, and can be located individually or together inside or outside of said container or appliance/device interior to monitor, track and report a level of product freshness, change, gas levels or contaminants, identify a product or container or the location of a product or a container or an appliance/device that can include a home or work setting. A primary brand logo or name 223 can represent a product. A secondary brand logo or name 224 can represent a technology such as a tag or a cloud service that provides a subscription service to detect product freshness levels and shelf-life projections or to order or replace a product. A brand logo or name descriptor 225 can describe or represent brand logos or names. A tertiary brand logo or name 226 can represent an appliance/device that can function with said product, container or technology. Further, a tag can also incorporate an executable code or provide unique tag or product or other identifiers, as discussed herein, to identify or register a tag, usage, software or algorithms to analyze or interpret tag data, among others. A tag, attached to or inside a container, or tag open/close or connect/disconnect device to order a dedicated product/service can incorporate a brand logo or name on the tag, tag and container or tag device to inform a user that the tag contains specific or unique data to said product/service.

For example, as shown in FIGS. 7-10, a tag can be disposed inside a closed container with a product. A sensor portion can be configured to include single or multiple sensors to detect gases from a product when sealed inside a container. A tag can also be configured with a sensor to detect a gas not produced or emitted by a product. This configuration can allow a tag in a sealed container to detect gas levels produced by a product inside a container so that an appliance/device reader can detect a change in the resistivity level or signal output of a tag and said change can be analyzed and interpreted to notify an appliance/device or user that a product is fresh or spoiled and also provide a projected shelf-life. A tag positioned to direct signals into a food product or item can also provide generated or gathered data that can be analyzed and interpreted to provide an indication of a change in a product as noted herein. Additionally, in response to a tag or signal change a product order can be placed into a virtual shopping basket, an order can be placed or a request to replace a product if spoiled, among others.

Further, a sensor can be configured to read a gas not associated with a product or spoilage process. For example, a tag in a sealed container can detect oxygen, or parts of oxygen: for example, and in a retail/work setting this can indicate that a container has been opened, tampered with or is broken depending on the reader setting, software or algorithms used and in a home environment an appliance/device can provide notice to a user that a product/service order is automatically placed or a container has been opened, among others. In another example, a user opens a sealed container and a tag inside the container detects an ambient gas not generated or stored inside the sealed container or associated with a product or a spoilage process, but can detect an ambient gas that can be analyzed and interpreted as an open container and for an order to be placed. The change analysis and interpretation can be configured for a home or work environment reader, software or algorithm. Any detection or order can provide a user or an appliance/device with a notice, an option to purchase or replace or to place a product into an online or virtual shopping basket and provide a user or appliance/device voice/text confirmation for each process. Additionally, a product delivery can be requested with each action with a confirmed time/date or provide available delivery times/dates for a user to select that can include a delivery confirmation. An order can be made immediately, provide for a delay period such as 24 hours and only allow one purchase per product per a determined time period unless a user indicates otherwise in a profile, application, account, appliance/device, network or related operation.

In the following description, as depicted in FIGS. 5, 6, 12, 14 and 15, and for purposes of explanation and not limitation, specific details are set forth for particular networks, communication systems, computers, terminals, appliances, devices, components, techniques, storage devices, data and network protocols, applications, software products and systems, operating systems, development interfaces, hardware, etc. in order to provide a thorough understanding of the present invention which can apply, function and operate to and with any of the appliances/devices, containers, garments, platforms, tags, products, technologies and interfaces disclosed herein to allow appliances/devices or networks augmented or virtual reality applications and software, Artificial Intelligence (AI), neural network applications, image and event recognition, voice/text activation and recognition software or hardware and interfaces to connect, communicate and interact with a user, user interface, appliance/device, garment and software and hardware programs and interfaces for connected or wireless communication via cloud, internet, satellite and other types of systems and services to operate, interact and communicate with any of the appliances, technologies, interfaces, networks or data modules or stores ("data modules") disclosed herein. As noted, all FIGs. where appropriate can disclose appropriate appliance/device, network or other interfaces.

It will be apparent to one skilled in the art that the present invention may be practiced in other embodiments that depart from these specific details. Detailed descriptions of well-known networks, computers, digital devices, storage devices, components, appliances/devices, technologies, techniques, data and network protocols, software products and systems, development interfaces, operating systems, and hardware are omitted so as not to obscure the description of the present invention.

The operations described herein can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 6:
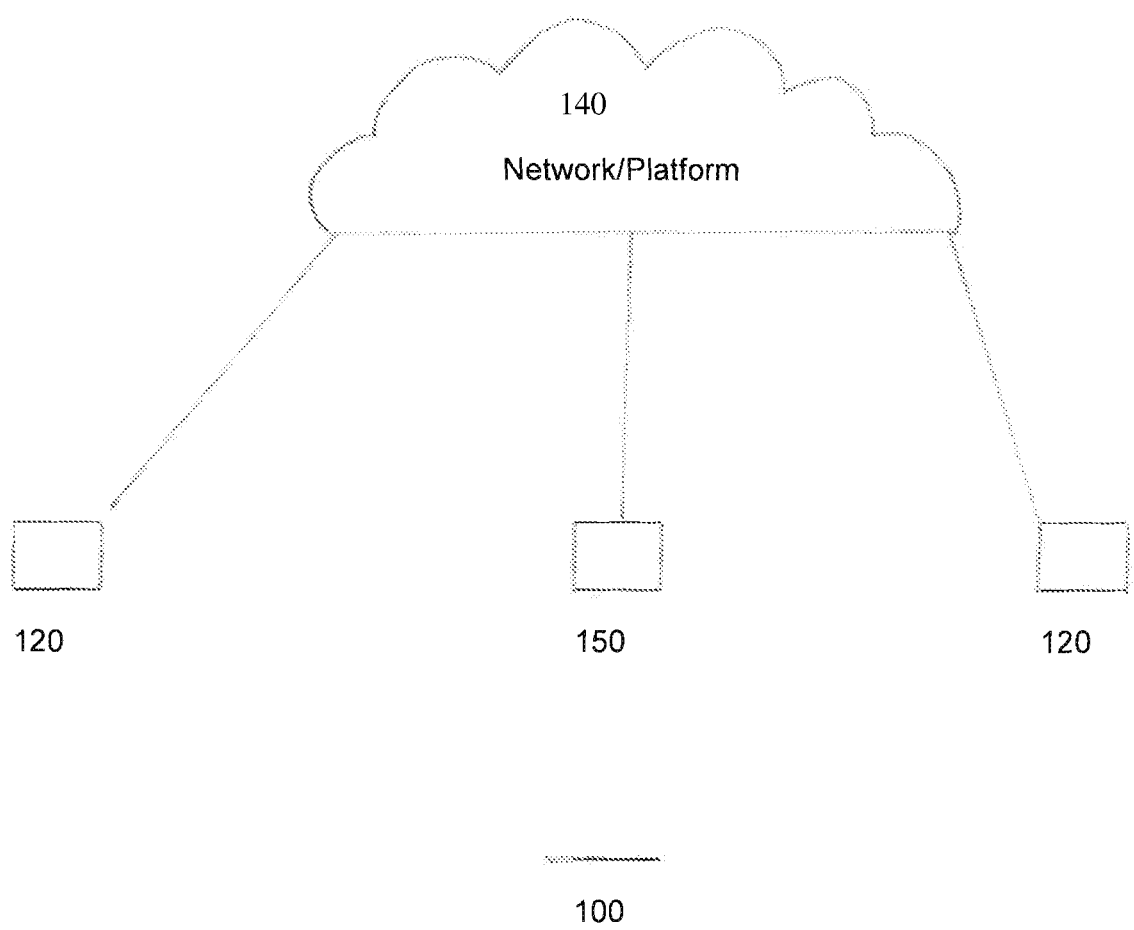
FIG. 6 illustrates a block diagram of a network system according to an embodiment of the present disclosure.
Figure 7:
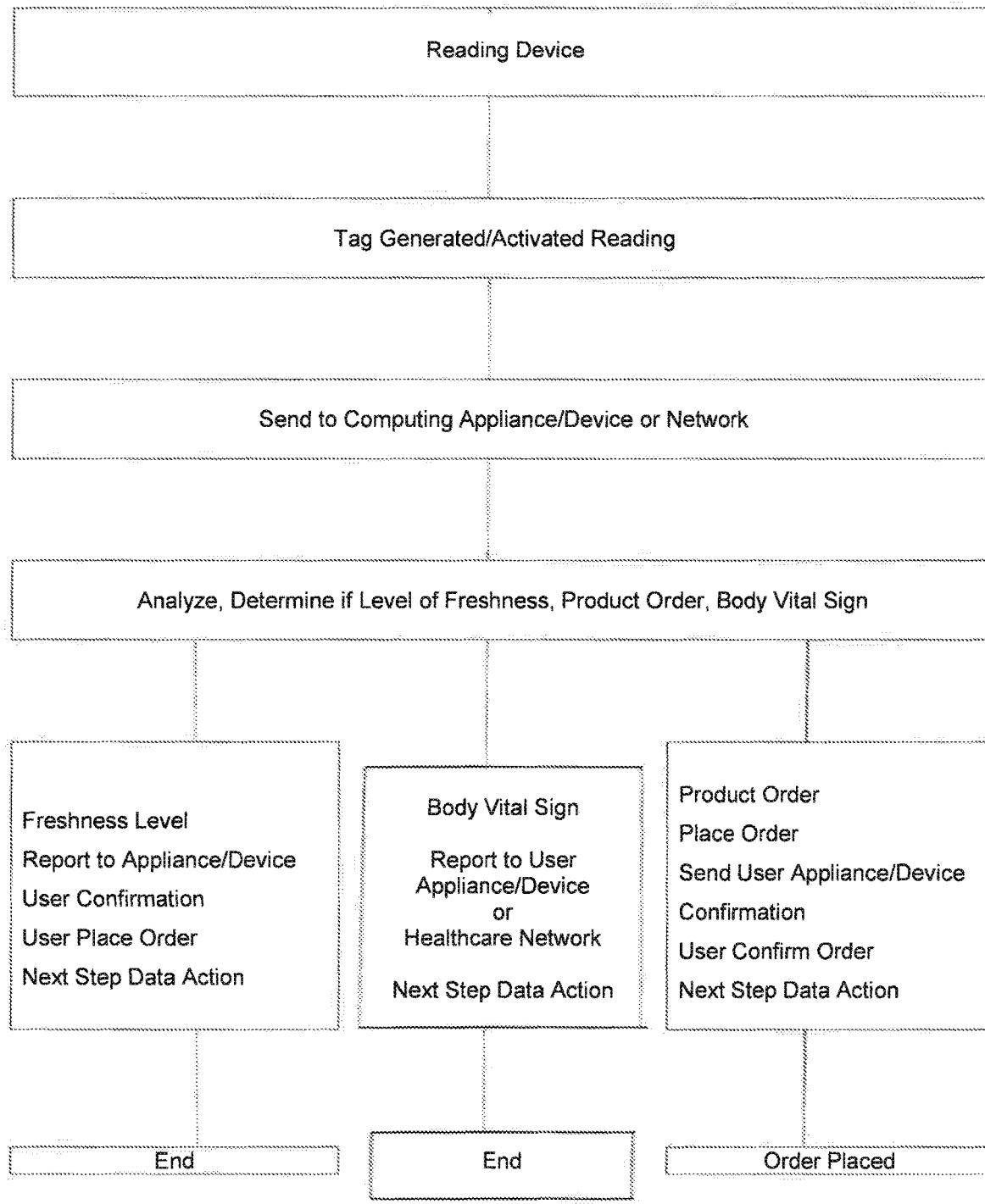
FIG. 7 illustrates a block diagram for an appliance/device or network system.
Figure 8:
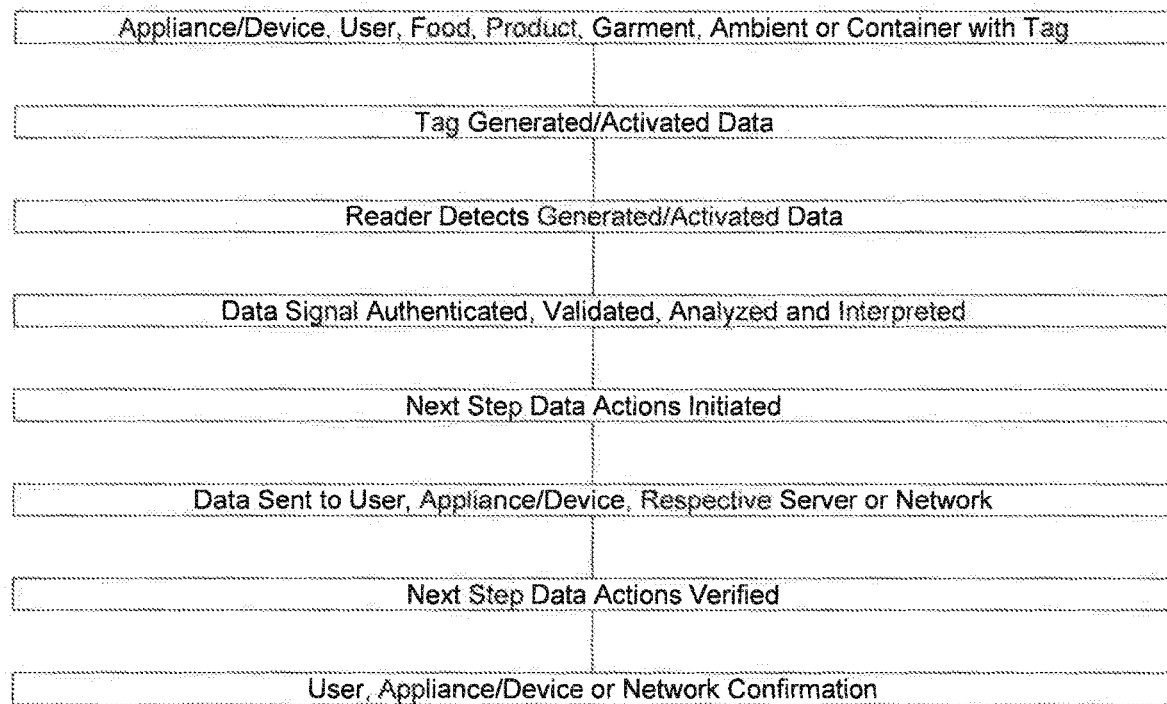
FIG. 8 illustrates a block diagram for an appliance/device or network system.
Figure 9:
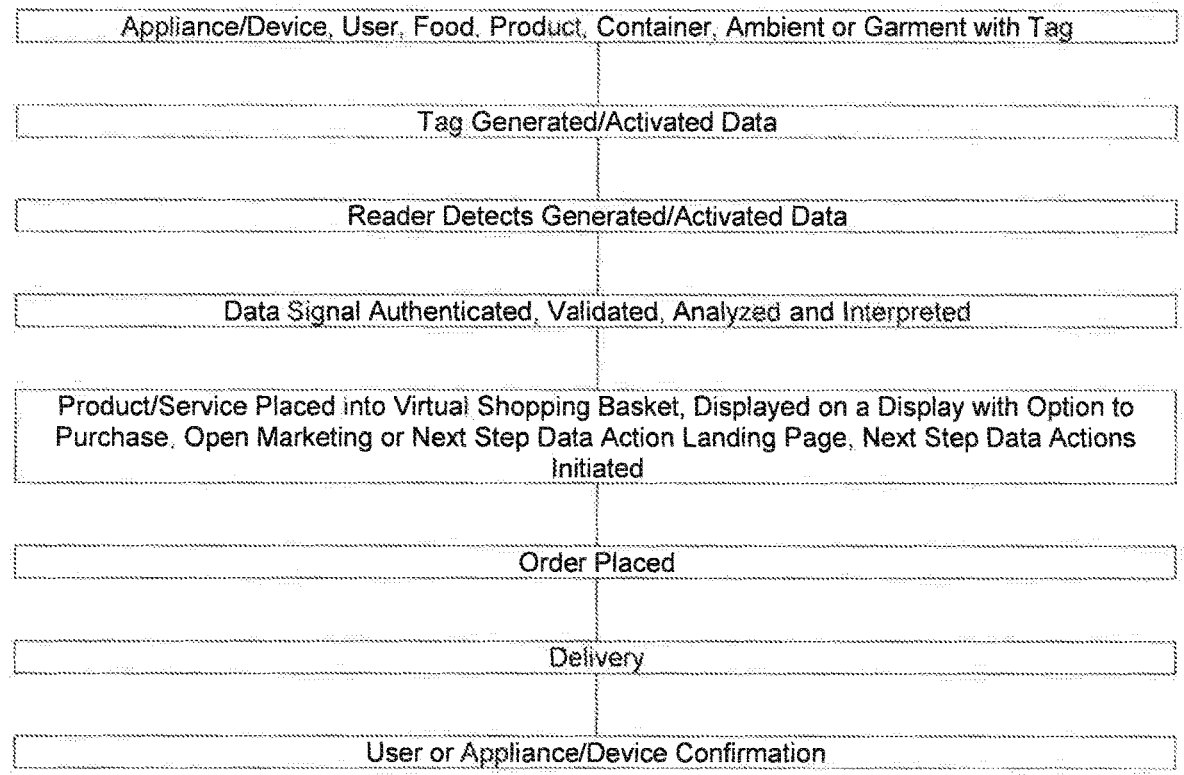
FIG. 9 illustrates a block diagram for an appliance/device or network system.
Figure 10:
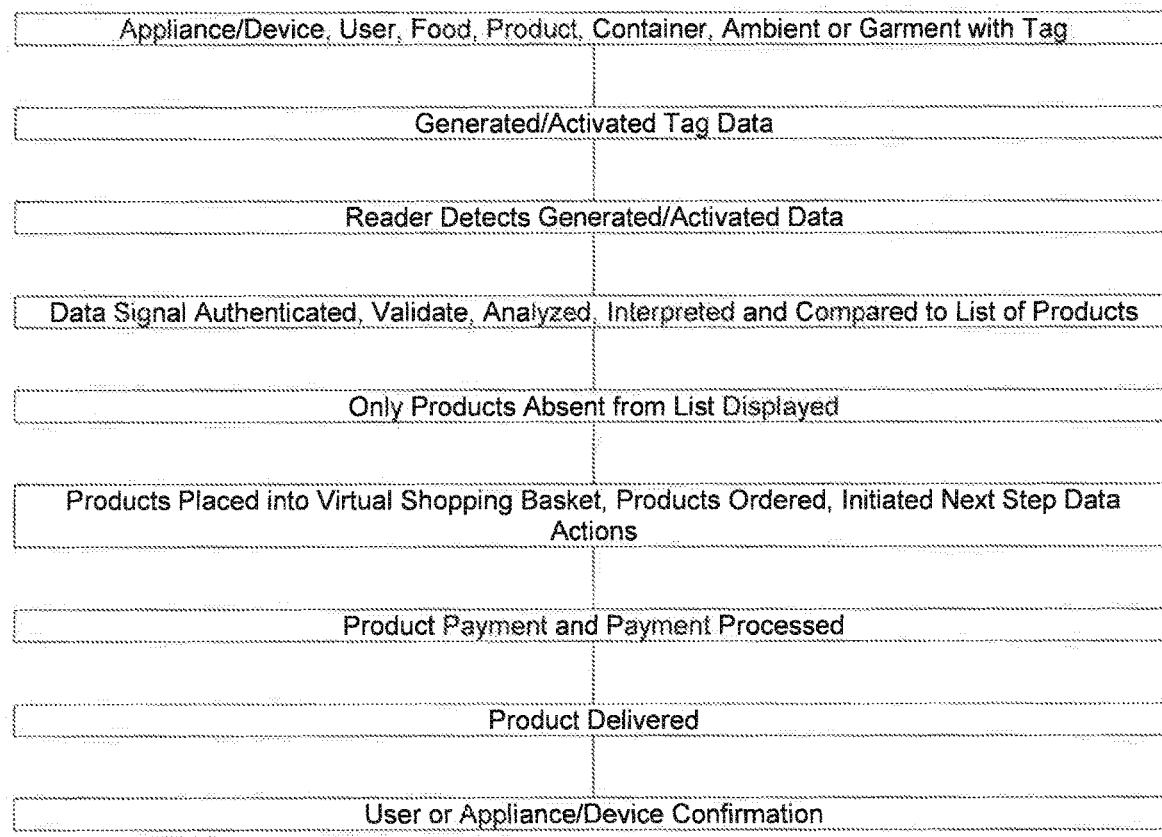
FIG. 10 illustrates a block diagram for an appliance/device or network system.

FIG. 6 depicts a product management system 100. The system 100 comprises a plurality of user interface devices 120 and a main server 150 interconnected via a communication network 140. Various networks 140 may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems can be internal or external, and can be connected to the system bus via the user-input interface, or other appropriate mechanism. Computers can be connected over the internet, an intranet, extranet, ethernet, or any other system that provides communications, such as by the network 140. Some suitable communications protocols may include TCP/IP, UDP, OSI, Ethernet, WAP, IEEE 802.11, Bluetooth, Zigbee, IrDa or any other desired protocol. Furthermore, components of the system may communicate through a combination of wired or wireless paths.

The system 100 can be accessed via any user interface device or appliance or device 120 that is capable of connecting to the main server 150. A user interface device or appliance or device 120 comprises a display, and preferably a touch screen display, reader, a video/camera and a microphone for inputting voice/sound and a speaker. An exemplary user interface device or appliance/device 120 contains a web browser or similar program, allowing in some embodiments for a secure SSL connection, and able to display HTML and CSS. This includes user interface devices or appliances/devices 120 such as tablets, iPads, Mac OS computers, Windows computers, e-readers, and mobile user devices such as an iPhone, Android, Samsung and Windows Phone. Preferably, the user interface device or appliance/device 120 is a smart: appliance, phone, speaker, display, television or tablet, among others. The user interface devices or appliance/device 120 can connect to the server 150 via the internet and/or wirelessly, such as through a mobile telephone, cloud or network 140, and/or any other suitable medium. User interface devices or appliances/devices 120 are able to communicate to the main server 150 so that content can be started on one user interface device or appliance/device 120 and later continued on a separate user interface device or appliance/device 120. The user interface device or appliance/device 120 preferably includes an I/O interface that allows a user to interact with the system 100. The I/O interface may include any hardware, software, or combination of hardware and software.

The CPU of the user interface device or appliance/device 120 can be implemented as a conventional microprocessor, application specific integrated circuit (ASIC), digital signal processor (DSP), programmable gate array (PGA), or the like. The CPU executes the instructions that are stored in order to process data. The set of instructions may include various instructions that perform a particular task or tasks, such as those shown in the appended flowchart. Such a set of instructions for performing a particular task may be characterized as a program, software program, software, engine, module, component, mechanism, algorithm or tool. The memory is preferably non-transitory memory and can include random access memory (RAM), ready-only memory (ROM), programmable memory, flash memory, hard drives, and the like. The memory, can include application programs, OS, application data etc. The exemplary computing device 120 can also include a network module connected to an antenna to communicate with the rest of the system or network 100.

The main server 150 described herein can include one or more computer systems directly connected to one another and/or connected over the network 140. Each computer system includes a processor, non-transitory memory, user input and user output mechanisms, a network interface, and executable program code (software) comprising computer executable instructions stored in non-transitory tangible memory that executes to control the operation of the main server 150. Preferably, the memory is non-volatile. Processor is in communication with the memory, which can be on the server or remote to the server. Similarly, the processors functional components formed of one or more modules of program code executing on one or more computers. Various commercially available computer systems and operating system software can be used to implement the hardware and software. The components of each server can be co-located or distributed. In addition, all or portions of the same software and/or hardware can be used to implement two or more of the functional servers (or processors) shown. The main server 150 can run any desired operating system, such as Windows, Mac OS X, Solaris or any other server based operating systems. Other embodiments can include different functional components. In addition, the present invention is not limited to a particular environment or main server 150 configuration. Preferably, the main server 150 is a cloud based computer system.

The main server 150 includes a web server and the query processing unit. The web server receives the user requests and sends it to the query processing unit. The query processing unit processes the request and responds back to the user interface device 120 via the web server. The query processing unit fetches data from the database server if additional information is needed for processing the request. The database is stored in the non-volatile memory. The term "database" includes a single database or a plurality of separate databases. The main server 150 can comprise the non-volatile memory or the main server 150 can be in communication with the non-volatile memory storing the database. The database can be stored at different locations.

A computing environment can include a server computer or any other device, appliance or system to provide computing functionality which can include a plurality of computing appliances or devices configured in one or a plurality of server or computer banks. In one embodiment, a computing environment can include a plurality of computing appliances or devices including a hosted or grid computing resource or other distributed computing arrangement. Relevant data modules or stores can include tag, user, home, retail, wholesale, manufacturer, hospitality, industrial, healthcare, agricultural or medicine/food/recipe data, information, identifiers, prices, profiles, historical, trends, health and food data, usages and recommendations for related products, services or providers and in some examples can provide: appliance/device; tag data; tags; tag signal conversion to synthesized human voice/text; device; body vital signs (i.e., heart rate, blood pressure, respiration rate, breath effort, pre-post-natal-fetal) and individual or health demographic data or profiles; biometric (and as noted herein) analysis and application; product, food, recipe and cooking times; expiration date data and of open containers; expiration date or shelf-life data after a container, food or medication is open; order-purchase-processing data; gas, volatile organic compound and chemical and product freshness and threshold levels, images and signatures; user or product profiles with comparative, historical and age/condition specific data for the aforementioned can be stored in data modules or a data location accessible to the computing environment and can comprise a plurality of data modules or stores. Stored data or modules can be associated with the operation of the various processes, applications and/or appliance or device functions described herein. Data modules or stores can allow a user, appliance/device, server or network to perform data searched, queries and data management and combine data, analysis or conversion processes, services and next step data actions from data or tag data sources that can include networks, servers, files, sets, packages, among others. Further, the terms "module", "program" or "engine" can also be used herein to describe part of a computing system integrated to perform a particular task or function. Data modules or stores can include any data or next step data actions disclosed herein that can connect, communicate or process individually, in sequence or combination herein.

Software program modules and data stored in the non-volatile memory of the main server 150 can be arranged in logical collections of related information on a plurality of computer systems with associated non-volatile memories. The software and data can be stored using any data structures known in the art including files, arrays, linked lists, relational database tables and the like.

The server 150 and user interface devices, appliances or devices 120 are programed to perform the methods and processes described herein. For example, an appliance/device such as an Apple, Nokia or Samsung can include or communicate with a tag reader and use an application to access tag data, conversion data, product ordering, healthcare or marketing information and data/information from a tag to manage said content either alphabetically, by type, location, module, store or section or product or body vital sign type and a user can add personal notes and other information to said retrieved materials such as comparative information and material, store name and location of said product, time, future sales dates, discounts, product specifications, recipes and ingredients and to read, for example, thin film tags in communication with a tag to view recorded gas or temperature and other sensor information, market and transport time and product processing, storage and transportation history of a product or container, product ordering, health data, purchasing, payment processing and delivery information, etc., said data which can also be stored or located on a data module herein. Said information can be accessed directly from a tag or via a product, container, garment or appliance/device application that can wirelessly access said information via a network, cloud or internet communication or connectivity or as described herein and can include tracking, monitoring and reporting product or ambient conditions/freshness and in containers or appliance compartments or body vital signs and medications and can enable product ordering, purchasing, payment processing, product delivery and any others described herein. A network or appliance/device can connect or communicate directly or indirectly with a local, remote or network computing appliance/device, server or product inventory/purchasing management system or other means to a third party product/service provider such as online or physical product manufacturer, retailer or wholesaler, fulfilment or product delivery service or payment/processing service, pharmacy or healthcare or well-being service or provider, credit/debit card provider/service or product/service payment, financial or bank provider to allow and facilitate product ordering, purchasing, payment processing or product delivery, among others. For example, any of the appliances/devices, local, remote appliance/device or network computing devices, servers or product/inventory management systems can contain a purchaser identifier (name, address, biometrics as disclosed herein, financial/banking or account information, contact information and payment methods as disclosed herein) which can represent or identify a purchaser, user, individual, business, corporation, etc., and can be added to an order to identify or complete a replacement or purchase order, payment processing, business or home delivery request or order, and any others noted herein. Further, an appliance/device, network or data modules can also store or manage backup data that can include comprise one or more of: user data; marketing material; product information, product ordering, purchasing and payment processing data, technology and information; container and appliance applications; recipes and cooking instructions; chemical, gas or volatile organic compound signatures or profiles and threshold levels and any other information described herein including user contact data (user address, bank, credit/debit card or third party payment information), appliance specific data and can include network or appliance biometric access or authorizations using facial, eye/iris, fingerprint, palm or voice recognition connected to or in communication with an appliance and operating systems for product ordering, purchasing and payment processing or delivery and data and network configuration data, authorization and access. In certain situations, appliance/device or network backup data can be encrypted and a memory structure can comprise a removable or non-removable secure or non-secure element.

As provided herein, a tag and a camera can each include a network interface. For example, a tag and camera can connect and communicate with each other and be in data communication with a computing environment through a network interface. This allows a tag and a camera to directly communicate with various data modules and applications across a network, cloud and others. Another embodiment includes an appliance/device with a tag reader and a camera connected to or in communication with cloud computing or internet network applications to read tags and products into an appliance/device inventory system and record container open date status and product expiration dates which can also be network connected to food recipe platforms, distribution or service provider networks as described herein. A user with an appliance/device or secure code access, website or network in communication with an appliance/device, pantry or operating and inventory management system, as described herein, can be configured to access, view, review and monitor appliance/device food, container, medication status processes or inventoried products and to place product orders via a connected distribution and service provider network. Containers with technologies can be configured to operate and control product ordering, purchasing, payment processing, delivery and appliance temperature, humidity, venting and other operating settings.

For example, as shown in FIGS. 7-10 and 20, an appliance/device inventory management system can comprise a digital list of products and tags for use with an appliance/device program or application ("app"). Devices can perform numerous inventory management functions; see for example, Patent Application Nos. 20140009291, 20160162715, WO2016109563 and WO2016109533, which are incorporated herein by reference in their entirety. A user can create a digital list of basic, shopping, retail, work or home products ("list") and provide the quantity or number of products to be maintained in an appliance, pantry or home or work area, such as a living, bed or bathroom, supply or file cabinet ("modules" or "room"). This data list can be entered and stored into an appliance/device or network by a user, tag reader, a camera, and voice, via a network connection or lists can be preloaded to an appliance/device or via another appliance/device or a combination as disclosed herein, with said products identified as basic, shopping, home, work or room products. The appliance/device program or app can be configured to function in several modes. An app mode can read all tags within reading range in an area or room and display all tag products on a handheld device or appliance display. The app can be configured to display only the tag products that are not located or identified or that are absent within a reading range when compared to a stored data list in an appliance/device or last virtual basket/shopping list. The app can operate in a home or work room mode; for example, a user can select a supply cabinet or bathroom mode and the app can be configured to read and display only products that are in a bathroom such as products intended for a bathroom based on a stored or provided marketing list or products that are missing or absent from a bathroom when compared to a stored list or products that do not belong in a bathroom or can suggest products based on the room and from the stored lists and network or databases for a tag reader, tag or camera image database. For example, an app mode can allow a user to read, list and display products that should 'not be present' in a room or space. For example, a user can select this mode for a living room and the app can scan/read the area to only identify tag products that do not belong in the room such as identifying a tag tube of toothpaste and thereby informing a user that this product should be located in another room such as a bathroom. In this manner a user can quickly walk through a home or work environment and quickly identify products that are present or available, identify products that are absent or missing, identify products that do not belong in a room or space, section or area and identify products that need to be ordered and to also receive product suggestions for each room, space, section or area with each reading or room mode in communication with respective network product/marketing and product list modules. For example, an app room mode can be configured into other apps or apps can be configured to operate individually or in any sequence with the capability to store search results or send them to other appliances/devices or networks for next step data actions. For example, when an appliance, pantry or room tag reader or camera (tags, readers with interfaces can connect to or communicate with a camera and image or general database) cannot identify or read a basic, shopping or room list product in an appliance, supply cabinet, pantry or home/work area that product data can be sent to an appliance/device or network with a notice or message regarding the product status or said data can be sent directly to a network to automatically place a product into an order basket or to place an order, purchase, payment processing or delivery request for a product. The app ordering function can also place an order after a predetermined time period, such as after a 24 hour period. An app can also connect or communicate with a camera or image database.

For example, if a reader and computing device cannot or does not identify a tag product in an appliance, pantry or home/work area or environment, and prior to placing an order based on the product not being present, an app can compare the inventory management data module/store/base with camera images, voice or tag products, databases or modules as well as pending shopping orders or recent purchase orders to verify the same or similar product is not available and can also compare and review virtual shopping baskets. When a tag reader detects an absent or missing product in an appliance, shopping or room list, home/work environment a tag database can query the camera image, voice or text product database to confirm or verify the presence or absence of a product from one or more rooms prior to sending a notification or placing an order and the camera, voice or text ordering functions can operate similarly with the respective tag reader and product databases. In this manner if a speaker or beacon detects that a box of tissues is absent or missing from a room the app can query the room and databases to locate a product if it has been moved to another room or location, can detect a similar product placed or stored inside a pantry, can identify a pending order or virtual shopping basket with the product or similar product and provide a user a notice or place an order. An app can also provide a mode to only identify and display a digital list of tags or products that report body vital signs or others described herein, provide freshness levels or expiration dates within determined times or dates, such as days, weeks or years. The app can also be configured to only identify certain types or groups of products such as fresh foods including meat, fish, dairy or fruit and vegetables or container products. An appliance app can be configured to create, read and display a list of products in an appliance, pantry or home/work environment in alphabetical order, food or product group, gas freshness level and expiration date, expiration date order, projected shelf-life and to search for specific recipe products or a product group, type or specific product can be inputted into an app to quickly search for the product. An app can provide a list of products that are present, absent, in the incorrect room or location or can suggest or recommend products based on products identified and stored in appliance/device, room, camera, voice, text, tag and product marketing databases, searches or user data history. For example, a user can walk into their living room, bathroom, pantry or open their refrigerator with a smart control, as explained herein, and a tag reader or camera can immediately inform a user that milk, a box of tissues, toilet paper, toothpaste or baking soda is absent or missing and to place an order or to replace said absent product with one from another area in the house. The app can also provide the user with information such as how long a product has been present in a room or area until the product is detected as absent. The appliance program or app can then either place said product into an online or virtual order basket or place an order via a network, open a product ordering page, display a product image on a display with a purchase option or upon reaching a predetermined dollar amount in a virtual basket can send the order, or send a product request to order, purchase, payment process or deliver for said products or via a third party product/service provider. The aforementioned functions can also be executed by using the camera functionality with product image recognition, database or network. Delivery request information can be sent by the order recipient, delivery service or connected network to a user with a schedule of available times to select from and to confirm or a specific delivery time confirmation can be sent. A notice and confirmation for each or any step of the inventory management process can be provided to a user. The aforementioned and all disclosure herein can apply to appliance/device product ordering via voice or camera by capturing voice and images and transmitting them to local, remote or network computing devices, servers or product inventory/ordering management systems which can query, connect and communicate with tags, voice or camera image data storage bases/stores. Furthermore, the system allows a user, appliance/device or network to bundle voice, tag or camera purchase orders together into a virtual shopping basket, a purchase or delivery order, payment processing or any other processes described or combined herein.

Figure 18:
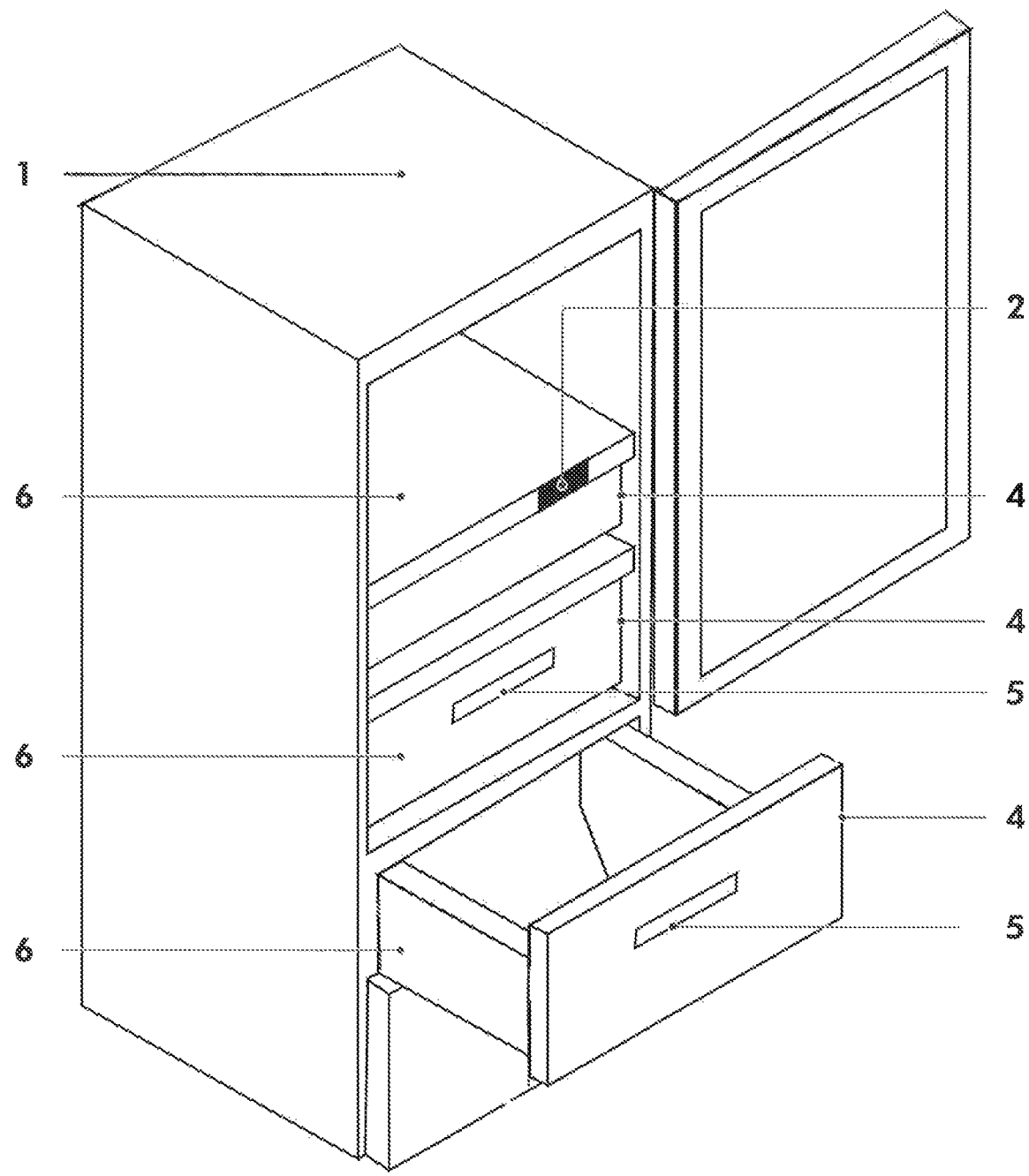
FIG. 18 illustrates an appliance/device for use with a tag, food or container method or system.
Figure 19:
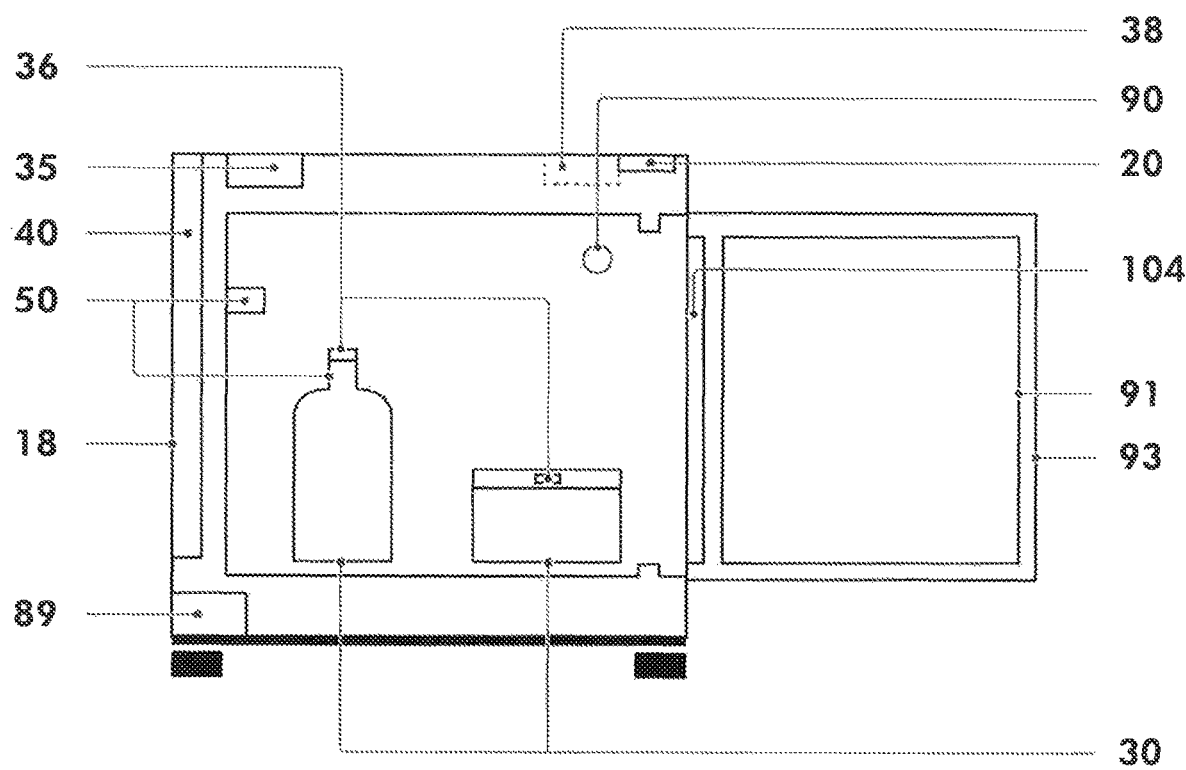
FIG. 19 illustrates an appliance/device for use with a tag, food or container method or system.

FIGS. 18-19, provide an aspect of the invention that can include an appliance/device ("appliance", "host appliance", "smart control") with an appliance/device that can be tag reader enabled and connect and communicate with an appliance control or operating system and controlled wirelessly via an appliance/device, smartphone, voice, text, or AI, among others. In one embodiment, an appliance/device can comprise any of the following: a housing 1 in which at least one sealable modular compartment 6 can be disposed with at least one or more tags, food or container items disposed therein. As shown in FIG. 18, an appliance/device control system 2 can include a display panel, microprocessor (CPU), memory device, network interface and software and hardware for a network enabled appliance/device including a wireless device connected to a micro-controller to communicate with cloud, internet or satellite networks, a smart control, other appliances/devices, containers, tags and to control and operate each system. Furthermore, a smart control or appliance/device and an appliance/device can be constructed to incorporate input/output ports, an interface or a microcontroller to allow a user to connect a smart control and an appliance/device together to communicate to allow software, an interface and micro-controllers to connect to communicate with hardware devices and with respective control and operating systems. As used herein an input/output port can include any system, including cable or wireless, to couple an appliance/device, a smart control or another appliance/device together to allow the creation of a network of appliances/devices to communicate and share information, data, electricity, wireless connectivity via cloud, internet, satellite, Bluetooth and control by a host appliance, smart control or appliance/device in the network. The coupling device can include an input/output port, slidable connectors, click or snap connectors, etc. The appliance network can also operate with an appliance/device to connect to a network to function as a host appliance or as an appliance/device or a recipient of network data, connectivity, among others.

An appliance/device and a smart control, and respective control and operating systems, can connect and communicate with each other using compatible control and operating systems, programs and software. An appliance can include a housing 1, 18, a temperature system 40 to create a range of temperature inside a housing 1, 18, a compartment 6 and a container 30 disposed therein that can connect to a control system 2, 20 and a display 38 and to individual or selected system components. A container can include a one-way valve 36 or tag/sensors 50. A vacuum pump, fan or means 89 in communication with a compartment and operating system can also be included. A humidity system 35 can create a range of humidity inside a compartment and a container disposed therein and can connect to a control system and to individual or selected system components. A compartment can include a valve 90 in communication with an operating system and an appliance aperture 104, a seal 91 on the open and close mechanism 93 that can include a drawer 4 with a handle 5 or other closure device for the compartment aperture as disclosed herein. All appliance systems can be controlled by the operating system or an appliance/device.

A smart control 508 can function as a countertop, refrigerator or handheld or appliance device to provide cooking instructions; monitor and control an appliance cooking network; function as a household or room security platform or device by connecting to a camera doorbell system or other home security camera systems to monitor or report with its security camera system; a camera with a motion detector, GPS, to detect and report levels of gas or ambient contaminants; check product inventory and place product orders, purchases and home delivery and monitor, track and report body vital signs using an appliance/device or reader/speaker 509 and include the control and operating systems of a smartphone or host appliance such as wireless enablement and communication, CPU, memory, control, tags and reader, camera or video, display panel 600, input/output and programmable capabilities 601, AI, augmented and virtual reality food, preparation, recipe or cooking capabilities with software and hardware to connect and communicate wirelessly, via electrical socket or input/output ports, interface or microcontroller with cable 503 to each appliance/device 501 and operating system connected to the smart control. A smart control can be placed into a base to operate or recharge the unit. A smart control can create a connection with the base via connectors situated at the bottom or base of a smart control to recharge or to connect the smart control operating system to the base and an appliance connected to the base to control and manage an appliance. Furthermore, a smart control can be placed into a refrigerator. A smart control base can be constructed or placed into a refrigerator and connected using an electrical cable to an interior appliance socket or an electrical source outside of the refrigerator such as a wall unit. In this manner, a smart control can be placed inside a refrigerator to track and monitor products, order products, etc., read body vital signs when a user is in proximity to an appliance to communicate with a network and data modules to suggest or recommend food or drink items or recipes as well as exercise or rest using tag or camera data in communication with data modules. A smart control can also operate with batteries. A smart control can be placed inside an appliance, pantry, medicine cabinet or house area to monitor products and activity and to order products or can be removed from an appliance such as a refrigerator to read and order products from areas such as the pantry or other house areas. The smart control can also be placed onto a kitchen counter in a base to control the cooking process of a network of appliances. The smart control can connect and communicate with online cooking sites or recipes via a network and data modules to provide step by step cooking preparation and instructions to prepare a meal and to order products to make specific recipes or suggest recipes based upon existing product inventory, tag freshness or projected shelf-life data and other tag data such as health status and related user accounts and data.

A smart control or appliance/device can incorporate single or multiple cameras that can be AI connected in an appliance/device compartment connected and in communication with an appliance control and operating system to identify users, individuals, containers, products, transactions, tags and events using appliance/device, internet and satellite or cloud software, interfaces and processes as noted herein. For example, a camera on an appliance door or inside an appliance compartment can identify a user, container or a product placed inside a compartment to adjust the required compartment temperature for a product or set a specific or mean temperature for more than one product. If the camera does not view a product in a compartment the temperature can be lowered to a predetermined temperature level until a product or container is identified. A camera can identify food items inside an appliance compartment and set the most effective temperature, humidity, venting and pressure settings for one or more food items that can include the same or different items such as fruit and vegetables, meat, dairy, bakery, fish or a range of respiring or non-respiring food items. A camera can capture a container or food item being placed inside an appliance and recommend to a user the most effective storage placement inside the refrigerator by suggesting via voice, light or location the most effective food drawer, shelf, appliance function or location to place said product. A camera can identify a user and read their body vital signs and recommend food items inside an appliance, food inventory or suggested food items that fit a described fitness or lifestyle based on health, weight or medical or health needs and requirements as noted herein.

As used herein, a container can be any receptacle such as a sealable or resealable receptacle or closure for use with a container that can also hold a product and constructed to hold environments such as modified atmosphere, gas, vacuum, pressure or vented environments with said containers not being destroyed by said applications. Containers are designed for use with tags configured to generate or provide data activation technologies to function with an appliance/device, garment, technologies or network. Containers can combine any tag functions or applications as described herein, to function individually, in combination or in sequence with any tag, data generation or activation configurations or combinations described herein with appliances/devices, garments, technologies or networks and related data modules in connection or communication with users, products, services, providers or markets "container").

As used herein, a container technology can include any technology that communicates, interacts, tracks, monitors, reports, benefits, orders, purchases, processes a payment or service or delivery or enhances the use, access, understanding, storage or appearance of a product such as a user interface, consumer or electronic device, good or appliance which can be placed, attached, affixed to or connect to or communicate with a product, container, garment or appliance such as, but not limited to, wireless technologies that can include Li-Fi, RFID, NFC and hybrid tags and an is card (active, passive, hybrid or battery assisted passive tags), a machine-readable code such as a universal product code or QR code that can comprise an array of black and white squares and can store data such as URLs or other information to be read by a camera on an appliance or other interface, bar codes that can be read by RF or bar code devices, thin film labels and applications with sensors and sensors in communication with wireless technologies such as Li-Fi interfaces and RFID, NFC or hybrid tags that can generate or activate data or next step data actions ("tags"), semiconductors, circuits, chip resistors, thin film chip resistors/transistors, memory and networks, electronic temperature and other-sensing labels including real-time sensing capabilities, electronic sensor circuits, plastic semiconductors, chemical sensors such as potentiometric sensors, chemical field-effect transistor sensors, chemiresistors and chemoreceptors. Technologies can further include containers or lids with sensors to monitor temperature, vacuum, humidity, time, container density, acidity levels and gases, chemicals and volatile organic compounds, such as but not limited to, aldehyde, acetic acids, ethylene, sulphur compounds, alcohol $CO_2$, $NH_3$, $H_2$, $H_2S$, $O_2$, $N_2$ and $SO_2$. Tags or sensors can connect to or communicate via wireless or wired methods to transfer data between two or more appliances/devices in communication with network interfaces and networks comprising Li-Fi, Wi-Fi, Bluetooth, internet, satellite and cloud computing technologies and all technologies described herein can be combined into complementary combinations or applications. Technologies can also include artificial intelligence, augmented, neural or virtual reality applications, software or hardware interfaces for use with appliances/devices. Firmware can also be incorporated into any relevant embodiment or appliance/device or network application to control the operation of an appliance/device on which it is hosted. All of the technologies and networks disclosed herein "technology" or "technologies" can be combined or function in any complementary order, combination or function with any other technology, network, appliance/device or process disclosed herein.

As used herein, product packaging, information and marketing materials as used herein can include any communicative indicia such as icons, abbreviated text, symbols, voice, graphs or graphical representations, shapes, colors, forms, or text, that can be digitally, physically, in combination, or by any other means, configured to communicate or connect to, incorporate, read, be written on, attach or associate with a product, container or appliance/device or other product, container or appliance/device and can include URLs, wired or wireless capabilities, cloud, satellite, web or internet data, containers, technologies, consumer goods, electronics, devices, user interfaces or appliances, including user account, applications, personal data, email and web site addresses, telephone numbers or any other digital, social media or personal address or banking or financial information as described herein. Product information can include technical and specification data, financial, legal and operating information, data and documents such as warranty, technical and operating manuals and technologies, products and services. Product marketing materials can include tag generated or activated data, next step data actions and voice or text data and materials, readers, URLs, price, product, place, promotions, marketing collateral, coupons, promotional materials, recipes, menus, movies, music, sales, visual and auditory materials, discounts, brochures and other printed or digital product information, visual aids used in sales presentations, user health and metrics, web content, product data sheets and white papers and any other materials disclosed herein (all of the aforementioned "product packaging" or "packaging" or "marketing").

As used herein an appliance can include consumer or electronic devices, user interfaces, electronic goods or manufacturer, retail, wholesale, home or professional goods or appliances including any user interface such as mobile, smartphones, readers, smart speakers, beacons, tablets, laptops, computers, glasses, watches, wired or wireless wearables, devices and clothing/garments, devices, rings, jewelry and wristbands, printers, cameras, micro-processors and microphones that can include use with an appliance, device, garment, consumer good, user interface or local or remote computing, cloud, server, network, appliance or device operating system and any other similar electronic device or appliance operating systems including functions and modes that include tag monitoring, tracking and reporting of generated or activated data or next step data actions, product ordering, purchasing, payment processing or delivery. Appliances can further include retail display or merchandising cabinets and refrigerated units, microwave oven, oven, induction cook top or UV light systems (any of these technologies can be incorporated as a single mode or combination mode in an appliance or interface and can be controlled by an interface or appliance controller, another or external appliance or interface, a product, container or smartphone, smart speaker, beacon, mobile or remote application to function with the other or external appliance functions and modes disclosed herein), stoves, refrigerators, freezers, washer/dryer, vacuum systems, toaster, rice maker, steamer, pasta cooker, crock pot, modular cooking units, portable or handheld devices which can be tag reader enabled, RFID light readers, and can combine, connect and communicate with other technologies, appliances or devices in any complementary or compatible combination and in any combinations of the aforementioned appliances, devices, technologies or tags as described herein (appliance/device or host appliance or "smart control").

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A system to provide user marketing recommendations or suggestions based on a level of interaction between a user and a product, comprising:
   a radio frequency tag in communication with the product;
   a computing device comprising a processor and a non-volatile, non-transitory memory, and configured to communicate with a user interface device, the computing device configured to utilize artificial intelligence;
   a radio frequency reader in communication with the computing device configured to receive a signal from the radio frequency tag;
   the radio frequency tag configured to send the signal to the computing device, the signal containing identity information about the product;
   the radio frequency tag configured to measure a motion of the user when in contact or close proximity to the radio frequency tag and the product;
   the radio frequency tag configured to send a signal to the radio frequency reader, the signal containing information about the motion of the user;
   an application stored in the non-volatile, non-transitory memory, configured to use artificial intelligence, and executable by the processor to:
   identify the product based on the identity information received from the radio frequency reader;
   interpret the signal to determine a level of the measured motion of the user with the radio frequency tag and the product;
   determine a level of user interaction with the radio frequency tag and the product based on whether the level of motion of the user fails, maintains, reaches or exceeds a determined level;
   when the level of user interaction reaches or exceeds the determined level generating marketing information for the product; and
   transmit the marketing information to the user interface device.

2. The system of claim 1, wherein the marketing information comprises a brand of the product.

3. The system of claim 2, wherein the marketing information further comprises at least one of a URL, price, place, promotion, marketing collateral, coupon, promotional material, recipe, menu, sale, discount, conversational artificial intelligence, an artificial intelligence action related to the product and a brochure.

4. The system of claim 1, wherein a user account stored in the memory comprises a user profile, the profile including at least one of personal data, data marketing preferences, health, a lifestyle, a product or a service related to the product for use to generate the marketing information.

5. The system of claim 1, wherein the radio frequency tag comprises a radio frequency identification tag, an NFC tag, or a radio frequency tag configured to use a Bluetooth protocol.

6. The system of claim 1, further comprising a camera in communication with the computing device and the artificial intelligence, configured to identify the product using the camera, to read a bar code or a QR code in communication with the product to identify the product using the camera or to detect the user's interaction with the product using the camera and to generate the marketing information for the product.

7. The system of claim 1, wherein the user interface device, comprising a microphone and a speaker, configured to use artificial intelligence to communicate with the user through the microphone and the speaker, to use conversational artificial intelligence to identify the product or the user's interaction with the product and to generate the marketing information for the product.

8. The system of claim 1, wherein the user interface device comprises at least one of a healthcare system, a smart speaker, a speaker, a smartphone, a server, a handheld device, a tablet, a computer, a watch, glasses, an appliance, a refrigerator or a display to display information.

9. The system of claim 1, wherein the computing device applies artificial intelligence to radio frequency signals and generated signals, voice, conversational language, text, code, a bar code, a QR code, sound or image to identify the product and to generate the marketing information.

10. The system of claim 1, wherein the marketing information includes another product or service related to the product.

11. The system claim 1, wherein the product is at least one of a drink product, a food product, a pharmaceutical product, a medical product, a garment product, footwear product or a healthcare insurance provider.

12. The system of claim 1, wherein the computing device is configured to generate a purchase order or delivery order for the product for a service provider to fulfil the purchase order or delivery order.

13. The system of claim 1, wherein the computing device is configured to generate or to transmit a payment to a healthcare insurance provider or to the service provider for the product or product delivery.

14. The system of claim 1, wherein the marketing information includes at least one of a product usage recommendation, a product usage suggestion and an action for the product in any communicative indicia or combination, including at least one of the following: an image, a video, text, a graph, code, music, sound, conversational language or natural language.

15. The system of claim 1, wherein the radio frequency tag in communication with the product is configured to be placed in contact or proximity to the user to track and monitor the user's body vital signs, including a heart rate, a respiration rate, a blood pressure, a breathing effort, or a body movement, and based on the user interaction with the identified product and the computing device is configured to use the data to generate the marketing information.

16. The system of claim 1, further comprising a plurality of the radio frequency tags in communication with the radio frequency reader.

17. The system of claim 16, wherein each of the plurality of radio frequency tags is configured to measure a motion of a respective user in proximity to a respective product.

18. The system of claim 1, further configured to determine data analysis based on the product identity information, one or more user interactions with the product, the user's interaction with the one or more products to generate data analysis for pricing, inventory or orders for the product.

19. A method of providing user marketing recommendations or suggestions based on a level of interaction between a user and a product, comprising:
   providing a radio frequency tag in communication with the product;
   providing a computing device comprising a processor and a non-volatile, non-transitory memory, and configured to communicate with a user interface device, the computing device configured to utilize artificial intelligence;
   providing a radio frequency reader in communication with the computing device configured to receive a signal from the radio frequency tag;
   the radio frequency tag sending the signal to the computing device, the signal containing identity information about the product;
   the radio frequency tag measuring a motion of the user in contact or close proximity to the radio frequency tag and the product;
   the radio frequency tag sending a signal to the radio frequency reader, the signal containing information about the motion of the user;
   executing by the processor an application stored in the non-volatile, non-transitory memory, using artificial intelligence, to:
   identify the product based on the identity information received from the radio frequency reader;
   interpret the signal to determine a level of the measured motion of the user with the radio frequency tag and the product;
   determine a level of user interaction with the radio frequency tag and the product based on whether the level of motion of the user fails, maintains, reaches or exceeds a determined level;
   the level of user interaction reaching or exceeding the determined level and generate, based on the user interaction with the product, marketing information for the product; and
   transmitting the marketing information to the user interface device.

20. The method of claim 19, wherein the marketing information comprises a brand of the product.

21. The method of claim 20, wherein the marketing information further comprises at least one of a URL, price, place, promotion, marketing collateral, coupon, promotional material, recipe, menu, sale, discount, conversational artificial intelligence, an artificial intelligence action related to the product and a brochure.

22. The method of claim 19, wherein the radio frequency tag comprises a radio frequency identification tag, an NFC tag, or a radio frequency tag configured to use a Bluetooth protocol.

23. A method of providing marketing recommendations or suggestions based on a level of interaction between a user and a plurality of products, comprising:
   providing a plurality of radio frequency tags each in communication with a respective product;
   providing a computing device comprising a processor and a non-volatile, non-transitory memory, and configured to communicate with a user interface device, the computing device configured to utilize artificial intelligence;
   providing a radio frequency reader in communication with the computing device configured to receive a signal from the plurality of radio frequency tags;
   each radio frequency tag sending a signal to the computing device, the signal containing identity information about the respective product;
   each radio frequency tag measuring a motion of the user in contact or close proximity to each radio frequency tag and the respective product;
   each radio frequency tag configured to send the signal to the radio frequency reader, the signal containing information about the motion of the user;
   executing an application stored in the non-volatile, non-transitory memory by the processor using artificial intelligence to:
   identify the product based on the identity information received from the radio frequency reader;
   interpret the signal to determine a level of the measured motion of the user with the radio frequency tag and the product;
   determine a level of user interaction with each radio frequency tag and each product based on whether the level of motion of the user fails, maintains, reaches or exceeds a determined level;
   the level of user interaction reaching or exceeding the determined level and generate, based on the user interaction with the product, marketing information for the product; and
   transmitting the marketing information to the user interface device.

* * * * *